(12) United States Patent
Xiao et al.

(10) Patent No.: US 12,475,511 B2
(45) Date of Patent: Nov. 18, 2025

(54) TARGET RECOMMENDATION METHOD AND APPARATUS, AND STORAGE MEDIUM

(71) Applicant: FUTU NETWORK TECHNOLOGY (SHENZHEN) CO., LTD., Guangdong (CN)

(72) Inventors: Chi Xiao, Guangdong (CN); Zihao Wu, Guangdong (CN)

(73) Assignee: FUTU NETWORK TECHNOLOGY (SHENZHEN) CO., LTD., Guangdong (CN)

( * ) Notice: Subject to any disclaimer, the term of this patent is extended or adjusted under 35 U.S.C. 154(b) by 87 days.

(21) Appl. No.: 18/389,815

(22) Filed: Dec. 20, 2023

(65) Prior Publication Data

US 2024/0119526 A1 Apr. 11, 2024

Related U.S. Application Data

(63) Continuation of application No. PCT/CN2022/101202, filed on Jun. 24, 2022.

(30) Foreign Application Priority Data

Jul. 13, 2021 (CN) .......................... 202110788847.0

(51) Int. Cl.
*G06Q 40/00* (2023.01)
*G06F 16/9535* (2019.01)
(Continued)

(52) U.S. Cl.
CPC .......... *G06Q 40/04* (2013.01); *G06F 16/9535* (2019.01); *G06F 16/954* (2019.01)

(58) Field of Classification Search
CPC ... G06Q 40/04; G06F 16/9535; G06F 16/954; Y02D 10/00
See application file for complete search history.

(56) References Cited

U.S. PATENT DOCUMENTS 8,326,715 B2 * 12/2012 Feuser ................... G06Q 40/04
705/35
2002/0161684 A1 * 10/2002 Whitworth ............. G06Q 40/04
705/36 R
(Continued)

FOREIGN PATENT DOCUMENTS

CN 105989540 A 10/2016
CN 107481143 A 12/2017
(Continued)

OTHER PUBLICATIONS

Applying Investment Satisfied Capability Index and Genetic Algorithms to Construct the Stocks Portfolio; 2008 3rd International Conference on Innovative Computing Information and Control (2008, p. 265); Jui-Fang Chang, Tien-Wang Tsaur, Jo-Chun Huang; Jun. 18, 2008. (Year: 2008).*

(Continued)

*Primary Examiner* — Tien C Nguyen

(57) ABSTRACT

The present disclosure discloses a target recommendation method and apparatus, and a storage medium. The method includes: entering a stock selection page including a navigation bar, in which the navigation bar including P stock selection indexes, and P is an integer greater than 1; obtaining screening information triggered by a user based on the P stock selection indexes to generate Q stock selection indexes, where Q is a positive integer smaller than or equal to P; and performing a search based on the Q stock selection indexes to obtain K recommended stocks, where K is a positive integer. Using the embodiments of the present disclosure intelligence of a stock selection can be improved.

19 Claims, 18 Drawing Sheets

(51) Int. Cl.
*G06F 16/954* (2019.01)
*G06Q 40/04* (2012.01)

(56) References Cited

U.S. PATENT DOCUMENTS

| | | | | |
|---|---|---|---|---|
| 2004/0181477 A1* | 9/2004 | Sauter | ............... | G06Q 40/00 |
| | | | | 705/36 R |
| 2008/0059356 A1* | 3/2008 | Brodsky | ............ | G06Q 40/08 |
| | | | | 705/37 |
| 2008/0183640 A1* | 7/2008 | Shalen | ............... | G06Q 40/06 |
| | | | | 705/36 R |
| 2019/0347734 A1* | 11/2019 | Flores | ............ | G06F 16/1865 |

FOREIGN PATENT DOCUMENTS

| | | |
|---|---|---|
| CN | 108154436 A | 6/2018 |
| CN | 108710461 A | 10/2018 |
| CN | 109146680 A | 1/2019 |
| CN | 109241908 A | 1/2019 |
| CN | 110910253 A | 3/2020 |
| CN | 110942386 A | 3/2020 |
| CN | 111897861 A | 11/2020 |
| CN | 112598521 A | 4/2021 |
| CN | 113034280 A | 6/2021 |
| CN | 113434773 A | 9/2021 |
| JP | 2007507797 A | 3/2007 |
| JP | 2013104953 A | 5/2013 |
| JP | 2013246508 A | 12/2013 |
| JP | 2014182701 A | 9/2014 |
| JP | 2019101607 A | 6/2019 |
| JP | 2020523715 A | 8/2020 |
| JP | 2021040169 A | 3/2021 |

OTHER PUBLICATIONS

Predicting Stock Price Movements Based on Different Categories of News Articles; 2015 IEEE Symposium Series on Computational Intelligence (2015, pp. 703-710); Yauheniya Shynkevich, T.M. McGinnity, Sonya Coleman, Ammar Belatreche; Dec. 7, 2015. (Year: 2015).*
First Office Action dated Nov. 29, 2024 received in corresponding patent family application No. JP2023-580937. English translation attached.
Korosuke, Short-term system trading aiming for a V-shaped recovery that turns a crash into upward momentum-Strategic trading rules that work with "pullbacks" and "finishoffs", Dec. 3, 2020, pp. 260-267.
First Office Action dated Feb. 10, 2025 received in corresponding patent family application No. CA3224645.
International Search Report dated Sep. 28, 2022 in International Application No. PCT/CN2022/101202. English translation attached.
The First Office action from corresponding Chinese Application No. 202110788847.0, dated May 30, 2022. English translation attached.
The Second Office action from corresponding Chinese Application No. 202110788847.0, dated Jan. 13, 2023. English translation attached.
The Grant Notice from corresponding Chinese Application No. 202110788847.0, dated Jun. 25, 2023. English translation attached.
Lan, Shuiping et al. "Research on Face Recognition Technology of Single Object" Modern Electronic Technology, vol. 21, Nov. 1, 2008 (Nov. 1, 2008), pp. 1-10.
Jin, Xin, "Research on Face Recognition Based on Real-time Video" Computer Knowledge and Technology, vol. 14, Dec. 31, 2011 (Dec. 31, 2011), pp. 1-10.
First Office Action dated Mar. 20, 2025 received in corresponding patent family application No. AU2022309412.
Decision of Refusal dated May 9, 2025 received in corresponding patent family application No. JP2023580937. English translation attached.

* cited by examiner

FIG. 14

TARGET RECOMMENDATION METHOD AND APPARATUS, AND STORAGE MEDIUM

CROSS-REFERENCE TO RELATED APPLICATIONS

This application is a continuation of International Application No. PCT/CN2022/101202 filed on Jun. 24, 2022, which claims priority to Chinese Patent Application No. 202110788847.0, entitled "TARGET RECOMMENDATION METHOD AND APPARATUS, AND STORAGE MEDIUM", and filed on Jul. 13, 2021, the entire disclosure of which is incorporated herein by reference.

FIELD

The present disclosure relates to the field of data processing, and more particularly, to a target recommendation method and apparatus, and a storage medium.

BACKEND

With widespread prevalence and use in electronic products (such as mobile phones, tablet computers, etc.), the electronic products can support more and more applications and have increasingly powerful functions, and the electronic devices move towards a diversified and personalized direction to become indispensable electronic devices in users' life.

In life, stock speculation in the mobile terminal is also a part of users' life. Currently, there is stock speculation software in the mobile terminal on the market that supports stock screening, but it mainly relies on users to view various indexes for stock selection, which significantly reduces efficiency of the stock screening. Therefore, how to improve intelligence of stock selection is an urgent issue to be resolved.

SUMMARY

Embodiments of the present disclosure provide a target recommendation method and apparatus, and a storage medium, capable of improving intelligence of stock selection.

In a first aspect, embodiments of the present disclosure provide a target recommendation method. The method is applied for an electronic device. The target recommendation method includes: entering a stock selection page including a navigation bar, the navigation bar including P stock selection indexes, and P being an integer greater than 1; obtaining screening information triggered by a user based on the P stock selection indexes to generate Q stock selection indexes, Q being a positive integer smaller than or equal to P; and performing a search based on the Q stock selection indexes to obtain K recommended stocks, K being a positive integer.

In a second aspect, embodiments of the present disclosure provide a target recommendation apparatus. The apparatus is applied in an electronic device. The apparatus includes a display unit, a screening unit, and a search unit. The display unit is configured to enter a stock selection page including a navigation bar. The navigation bar includes P stock selection indexes, and P is an integer greater than 1. The screening unit is configured to obtain screening information triggered by a user based on the P stock selection indexes to generate Q stock selection indexes. Q is a positive integer smaller than or equal to P. The search unit is configured to perform a search based on the Q stock selection indexes to obtain K recommended stocks. K is a positive integer.

In a third aspect, embodiments of the present disclosure provide an electronic device. The electronic device includes a processor, a memory, a communication interface, and one or more programs. The one or more programs is stored in the memory and configured to be executed by the processor, and the one or more programs include instructions configured to perform the steps described in the method of the first aspect of the embodiments of the present disclosure.

In a fourth aspect, embodiments of the present disclosure provide a computer-readable storage medium. The computer-readable storage medium has a computer program stored thereon. The computer program, when executed by a processor, implements some or all of the steps described in the method of the first aspect of the embodiment of the present disclosure.

In a fifth aspect, embodiments of the present disclosure provide a computer program product. The computer program product includes a non-transitory computer-readable storage medium storing a computer program. The computer program is operable to cause a computer to perform some or all of the steps described in the method of the first aspect of the present disclosure. The computer program product may be a software installation package.

The embodiments of the present disclosure have the following beneficial effects.

It can be seen that the target recommendation method and apparatus and the storage medium described in the embodiments of the present disclosure are applied for the electronic device. A stock selection page including a navigation bar is entered, the navigation bar includes P stock selection indexes, and P is an integer greater than 1; screening information triggered by a user based on the P stock selection indexes is obtained to generate Q stock selection indexes, where Q is a positive integer smaller than or equal to P; and a search is performed based on the Q stock selection indexes to obtain K recommended stocks, where K is a positive integer. In this way, the search can be realized based on the stock selection indexes selected by the user to obtain the corresponding recommended stocks. Therefore, the intelligence of the stock selection can be improved.

BRIEF DESCRIPTION OF THE DRAWINGS

In order to clearly explain technical solutions of embodiments of the present disclosure or in the related art, drawings used in description of the embodiments or the related art will be briefly described below. The drawings described below merely illustrate some embodiments of the present disclosure. Based on these drawings, other drawings can be obtained by those skilled in the art without inventive effort.

FIG. 14 is a schematic diagram of a stock selection result list according to an embodiment of the present disclosure.

DETAILED DESCRIPTION

An electronic device may include various handheld devices (a mobile phone, a tablet computer, etc.), a vehicle-mounted device, a wearable device (such as a smart watch, smart glasses, etc.), a computing device that are with a wireless communication function, other processing devices connected to a wireless modem, or various forms of User Equipment (UE), a Mobile Station (MS), a virtual reality/augmented reality device, a terminal device, etc., and the electronic device may also be a server.

Embodiments of the present disclosure are described in detail below.

Figure 1A:
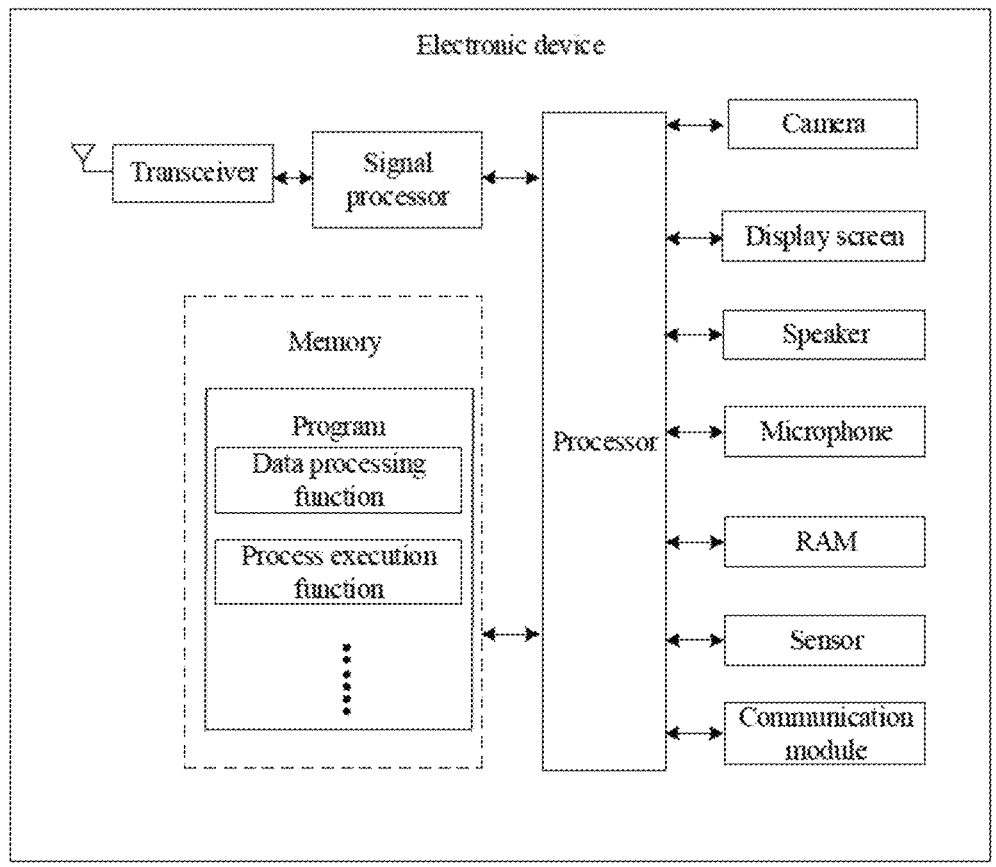
FIG. 1A is a schematic structural view of an electronic device according to an embodiment of the present disclosure.

As illustrated in FIG. 1A, FIG. 1A is a schematic structural view of an electronic device according to an embodiment of the present disclosure. The electronic device includes a processor, a memory, a Random Access Memory (RAM), and a display screen. Each of the memory, the RAM, and the display screen is connected to the processor.

Further, the electronic device may further include a speaker, a microphone, a camera, a communication interface, a signal processor, and a sensor. Each of the speaker, the microphone, the camera, the signal processor, and the sensor is connected to the processor. The communication interface is connected to the signal processor.

The display screen may be a Liquid Crystal Display (LCD), an Organic Light Emitting Diode (OLED) or Inorganic Light Emitting Diode (ILED), an Active Matrix Organic Light Emitting Diode (AMOLED) panel, etc.

The camera may be a common camera or an infrared camera, or a wide-angle camera, which is not limited herein. The camera may be a front-facing camera or a rear-facing camera, which is not limited herein. The camera may also be a dual camera, for example, an infrared camera and a visible light camera, or a common camera and a wide-angle camera. Two or more cameras may be provided, which is not limited herein.

The sensor includes at least one of a photosensitive sensor, a gyroscope, an infrared proximity sensor, a vein sensor, a fingerprint sensor, or a pressure sensor, etc. The photosensitive sensor is also referred to as an ambient light sensor and is configured to detect ambient light brightness. The photosensitive sensor may include a photosensitive element and an analog-to-digital converter. The photosensitive element is configured to convert a collected optical signal into an electrical signal. The analog-to-digital converter is configured to convert the electrical signal into a digital signal. Optionally, the photosensitive sensor may further include a signal amplifier. The signal amplifier may amplify the electrical signal converted into by the photosensitive element and then output the amplified electrical signal to the analog-to-digital converter. The photosensitive element may include at least one of a photodiode, a phototransistor, a photoresistor, or a silicon photocell.

The processor is a control center of the electronic device, which connects various parts of the whole electronic device by using various interfaces and wires, and executes various functions and processes data of the electronic device by running or executing a software program and/or a module stored in a memory and calling data stored in the memory, to perform overall monitoring and control on the electronic device.

The processor may integrate an application processor and a modulation and demodulation processor. The application processor primarily processes an operating system, a user interface, an application program, etc. The modulation and demodulation processor primarily processes wireless communication. It may be understood that the above-mentioned modulation and demodulation processor may also not be integrated into the processor.

The memory is configured to store a software program and/or a module. The processor executes various function applications and data processing of the electronic device by running a software program and/or a module stored in the memory. The memory may primarily include a storage program area and a storage data area. The storage program area may store an operating system, a software program required by at least one function, etc. The storage data area may store data created based on use of the electronic device. In addition, the memory may include a high-speed random access memory, and may further include a non-volatile memory, such as at least one magnetic disk storage device, a flash memory device, or other volatile solid-state memory devices.

The electronic device described based on FIG. 1A may be configured to perform actions at the following steps of: entering a stock selection page including a navigation bar, in which the navigation bar includes P stock selection indexes, and P is an integer greater than 1; obtaining screening information triggered by a user based on the P stock selection indexes to generate Q stock selection indexes, where Q is a positive integer smaller than or equal to P; and performing a search based on the Q stock selection indexes to obtain K recommended stocks, where K is a positive integer.

It can be seen that according to the electronic device described in the embodiments of the present disclosure, the stock selection page including the navigation bar is entered, the navigation bar includes the P stock selection indexes, and P is an integer greater than 1; screening information triggered by the user based on the P stock selection indexes is obtained to generate the Q stock selection indexes, where Q is the positive integer smaller than or equal to P; and the search is performed based on the Q stock selection indexes to obtain the K recommended stocks, where K is the positive integer. In this way, the search can be realized based on the stock selection indexes selected by the user to obtain the corresponding recommended stocks. Therefore, the intelligence of the stock selection can be improved.

Figure 1B:
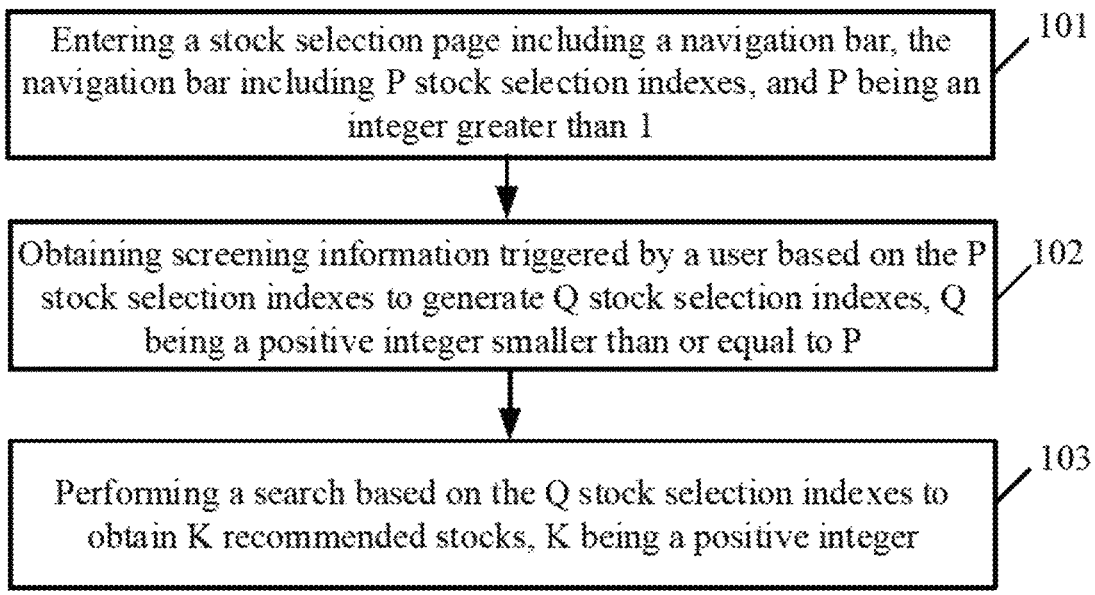
FIG. 1B is a schematic diagram of an interface demonstration of a selector according to an embodiment of the present disclosure.

Referring to FIG. 1B, FIG. 1B is a target recommendation method according to an embodiment of the present disclosure. The method is applied to the electronic device as illustrated in FIG. 1A, and specifically includes actions at steps 101 to 103.

At step 101, a stock selection page including a navigation bar is entered. The navigation bar includes P stock selection indexes, and P is an integer greater than 1.

In this embodiment of the present disclosure, the selection index may include at least one of a market index, a technical index, a financial index, a profit capability, a debt repayment capability, a debt paying off capability, an operation capability, a growth capability, or a cash flow, etc., which are not limited herein. The electronic device may be installed with a stock selector, and a stock required by the user may be selected by means of the stock selector.

Figure 1C:
FIG. 1C is a flowchart of a target recommendation method according to an embodiment of the present disclosure.

In a specific implementation, the stock selection page may include a navigation bar, the navigation bar may include P stock selection indexes, and P is an integer greater than 1. For example, as illustrated in FIG. 1C. FIG. 1C has a navigation bar in an index type at a left side of the page, which may help the user to quickly locate an index type as desired. At a right side of the page may be a specific index list, and each index may be folded/unfolded. When the user clicks a certain stock index, a corresponding index list may appear at the right side, and the user may edit the index list. Some indexes may perform screening based on a period, and some indexes may be not provided with period. The periodicity of the index may be predetermined or system default.

In addition, for indexes of a same type, an index with a period may be placed below an index without a period. When sliding to the index with the period, a corresponding period screening item may be suspended at a top to facilitate the user to quickly switch the period. The navigation bar at the left side and the period may both display with a number of corresponding screened indexes, and at a bottom left corner a total number of screened indexes may display. By clicking "X selected conditions" at the bottom left corner specific screened indexes would pop up. After a certain screened index is clicked, the index may be located to allow the user to conveniently modify the index. By clicking "Edit" a deletion operation may be performed on these indexes, for example, deleting a certain index or deleting a plurality of indexes in batches.

At step 102, screening information triggered by a user based on the P stock selection indexes is obtained to generate Q stock selection indexes. Q is a positive integer smaller than or equal to P.

In a specific implementation, the electronic device may display the P stock selection indexes in the navigation bar of the stock selection page, the user may screen the P stock selection indexes, and may also edit the selected stock selection index to obtain Q stock selection indexes, where the Q stock selection indexes may be placed in a selected stock selection index set, and Q is a positive integer smaller than or equal to P.

In some embodiments, the action at step 102 of obtaining screening information triggered by a user based on the P stock selection indexes to generate Q stock selection indexes may include actions at steps A21 and A22.

At step A21, a selection operation on the P stock selection indexes is monitored.

At step A22, in response to a first target stock selection index in the P stock selection indexes being selected, a selected stock selection index set and a number of indexes in the selected stock selection index set are updated, and when the selection operation ends, it is confirmed that stock selection indexes in the selected stock selection index set are the Q stock selection indexes. The first target stock selection index is a stock selection index which has not been selected in the P stock selection indexes.

In a specific implementation, the electronic device may monitor a selection operation on the P stock selection indexes. A first target stock selection index is taken as an example, the first target stock selection index is a stock selection index which has not been selected in the P stock selection indexes. In response to the first target selected stock selection index in the P stock selection indexes being selected, the electronic device may update a selected stock selection index set and a number of indexes in the selected stock selection index set. The selected stock selection index set includes at least one stock selection index. The selected stock selection index set may include all indexes that have been selected by the user before the selection operation. When the selection operation ends, the electronic device may confirm that the stock selection index in the selected stock selection index set is the Q stock selection indexes.

Further, in some embodiments, the method may further include actions at steps A1 and A2.

At step A1, whether the first target stock selection index has periodicity is detected.

At step A2, when the first target stock selection index has the periodicity, a number of selected periodic indexes corresponding to the first target stock selection index is updated.

In a specific implementation, considering that the stock itself has periodicity, a periodic stock includes a stock which rises and falls along with boom and bust of an economic period and is a type of stock with the largest quantity. This type of stock has a very high stock dividend payment and a relatively high stock price. Therefore, in an index selection process, the periodicity of the index may also be considered. Further, the electronic device can detect whether the first target stock selection index has periodicity, and therefore when the first target stock selection index has the periodicity, the electronic device may update a number of selected periodic indexes corresponding to the first target stock selection index. For example, a number of original selected periodic indexes is 5, and after updating, a number of selected periodic indexes is 6.

In some embodiments, the P stock selection indexes include at least one stock selection index of a first type and a stock selection index of a second type; the action at step 102 of obtaining the screening information triggered by the user based on the P stock selection indexes to generate the Q stock selection indexes or the action at step A21 of monitoring the selection operation on the P stock selection indexes may include actions at:

step S1 of selecting a stock selection index of the first type required by the user from the at least one stock selection index of the first type; and/or step S2 of in response to a screening range triggered by the user based on the stock selection index of the second type, obtaining a stock selection index of the second type required by the user.

The P stock selection indexes include at least one stock selection index of a first type and a stock selection index of a second type. The at least one stock selection index of the first type may be an index for which a numerical range cannot be manually set or an index for which a numerical range do not need to be set. The stock selection index of the second type can be an index for which a numerical range can be manually set. The at least one stock selection index of the first type may include at least one of a range index or a technical index, which is not limited herein. The range index is used to realize a stock market region setting, a sector setting, etc., which are not limited herein. The stock selection index of the second type includes at least one of a market index, a financial index, a profit capability, a debt repayment capability, an operation capability, a growth capability, a cash flow, a market performance, a characteristic index, or an economic commercial stock, which are not limited herein.

In a specific implementation, a stock selection index of the first type required by the user may be selected from the at least one stock selection index of the first type, that is, it is equivalent to setting a technical parameter of a model of each of the region, the sector, and a trend chart of the stock market. Then, in response to a screening range triggered by the user based on the stock selection index of the second type, a stock selection index of the second type required by the user is obtained. The screening range may be manually set. That is, the user can set a specific numerical range of each selection index of the second type, which is equivalent to setting some parameters of an individual stock that meets user requirements in the stock market to select an individual stock that meets predetermined user requirements from the stock market. The stock selection index of the first type and the stock selection index of the first type may be separately set, or may be set both, which may be specifically determined by the user.

In some embodiments, in the process of performing the action at step 102 or subsequent to performing an action at step 103, the method may further include actions at steps B1 to B3.

At step B1, a touch operation on a second target stock selection index in a selected stock selection index set is detected. The second target stock selection index is any stock selection index in the selected stock selection index set.

At step B2, when the touch operation is a deletion operation, the second target stock selection index in the selected stock selection index set is deleted.

At step B3, the selected stock selection index set and a number of indexes in the selected stock selection index set are updated.

In a specific implementation, the second target stock selection index is taken as an example. A second target stock selection index is any stock selection index in the selected stock selection index set, and the electronic device may detect a touch operation on the second target stock selection index in a selected stock selection index set. When the touch operation is a deletion operation, the electronic device may delete the second target stock selection index in the selected stock selection index set, and update the selected stock selection index set and a number of indexes in the selected stock selection index set. Further, considering that the stock has the periodicity, in the index deletion process, the periodicity of the index may also be considered. Further, the electronic device can detect whether the second target stock selection index has the periodicity, and therefore when the second target stock selection index has the periodicity, the electronic device may update a number of selected periodic indexes corresponding to the second target stock selection index.

Figure 1D:
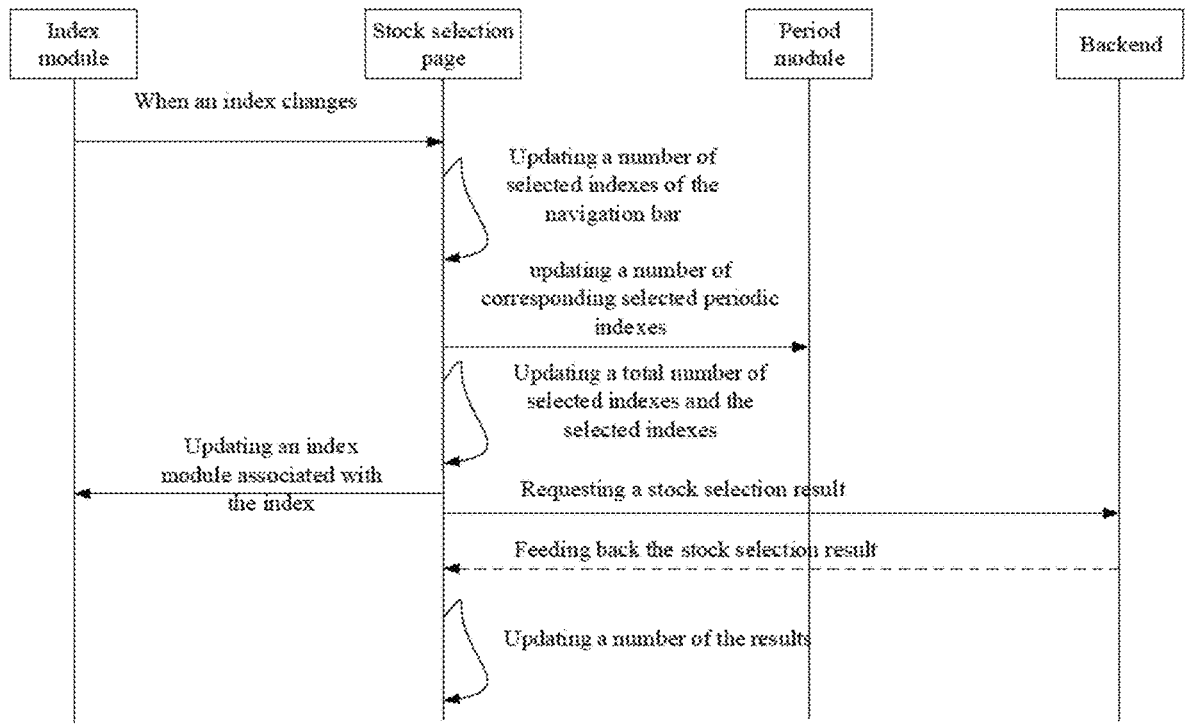
FIG. 1D is a flowchart of data updating according to an embodiment of the present disclosure.

For example, as illustrated in FIG. 1D, in a specific index screening process, for an index addition operation or an index deletion operation, the page may be updated once every time screening for an index is completed, and a number of selected indexes in each place may be updated after the screening for the index is completed. Then, a latest stock selection result may be requested from a backend, and a stock selection result may be updated after the backend returns the result. For example, when an index changes, a number of selected indexes of the navigation bar may be updated; a number of selected periodic indexes corresponding to a target index of an operation may be updated through a period module, and a total number of selected indexes and the selected indexes may be updated; and an index module associated with the index may be updated, a stock selection result is requested from a backend based on the selected index, the stock selection result fed back by the backend is received, and a number of the results is updated.

At step 103, a search is performed based on the Q stock selection indexes to obtain K recommended stocks. K is a positive integer.

The recommended stock may be a stock code or a stock name. The user may screen a stock expected by the user based on screening conditions of different indexes. The electronic device may further display K recommended stocks. Specifically, the Q stock selection indexes may be compared with a stock parameter of each stock in a database. When a stock parameter of any stock meets all stock selection index requirements of the Q stock selection indexes, the stock is used as a recommended stock. Conversely, when a stock parameter of any stock does not conform to any one of the Q stock selection indexes, the stock is not taken as a recommended stock. The database may include stock information of some or all stocks on the market. The stock information includes a stock parameter of each stock. The stock parameter may include at least one of a stock code, a stock name, a stock trend chart, a shareholder condition, a transaction situation, a market index, a financial index, a profit capability, a debt paying capability, an operation capability, a growth capability, a cash flow, a market performance, a characteristic index, an economic commercial stock, etc., which are not limited herein.

In some embodiments, the above-mentioned action at step 103 of performing the search based on the Q stock selection indexes to obtain the K recommended stocks may include actions at steps 31 and 32.

At step 31, a stock selection request is sent to a backend. The stock selection request carries the Q stock selection indexes.

At step 32, a stock selection result is received. The stock selection result includes the K recommended stocks and is obtained by the backend screening stocks in a stock database based on the Q stock selection indexes.

The backend may be a backend of the electronic device or a backend server. When the backend is a backend of the electronic device, a stock may be recommended in an offline situation. When the backend is a backend server, a stock may be recommended in an online situation. The stock database may include a plurality of stocks, and each stock includes different indexes.

Specifically, the electronic device can send a stock selection request to the backend, and the stock selection request carries the Q stock selection indexes. The backend can screen stocks in a stock database based on the Q stock selection indexes to obtain the K recommended stocks. Then, the backend sends the K recommended stocks to the electronic device, and the electronic device can receive a stock selection result.

In some embodiments, the method may further include actions at steps C1 to C4, subsequent to the above-mentioned action at step 103.

At step C1, a click operation on a third target stock selection index in a selected stock selection index set is detected. The third target stock selection index is any stock selection index in the selected stock selection index set.

At step C2, a period corresponding to the third target stock selection index is updated.

At step C3, a corresponding change in a period of an index having a same type as the third target stock selection index is notified.

At step C4, the third target stock selection index is located.

In a specific implementation, a third target stock selection index is taken as an example. The third target stock selection index is any stock selection index in the selected stock selection index set. The third target stock selection index may appear in a selected condition pop-up window, and if the electronic device may detect a click operation on a third target stock selection index in a selected stock selection index set, a period corresponding to the third target stock selection index may be updated, a corresponding change in a period of an index having a same type as the third target stock selection index is notified, and the third target stock selection index is located. By means of the operation, index viewing can be realized, and an associated index can be checked. In this way, the user can easily perform index confirmation.

Figure 1E:
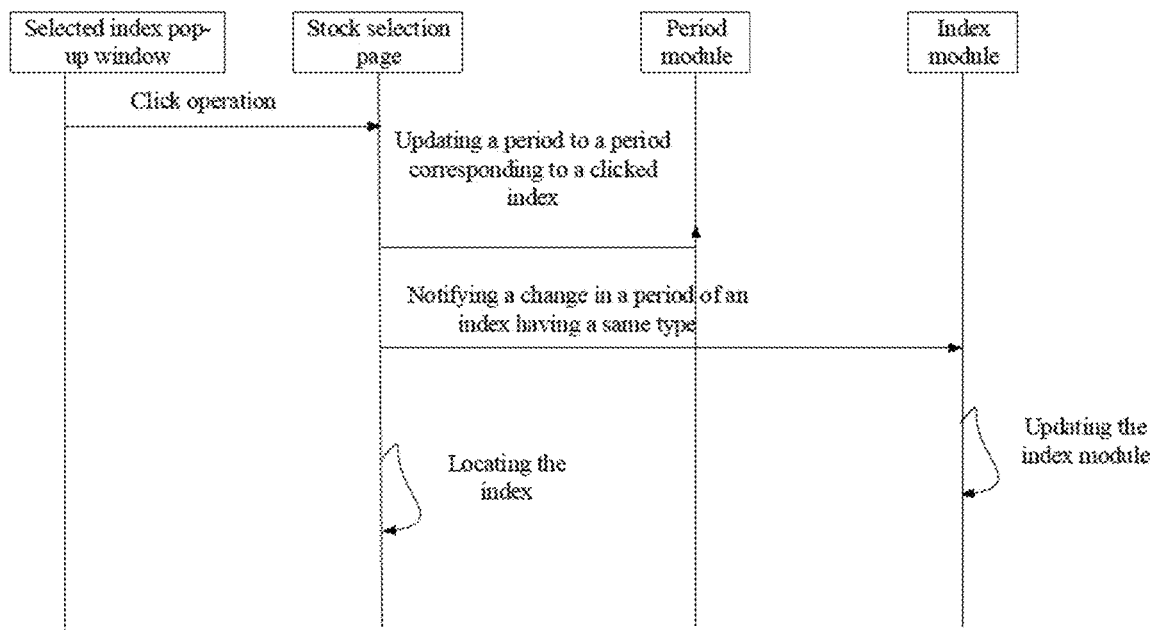
FIG. 1E is another flowchart of data updating according to an embodiment of the present disclosure.

For example, as illustrated in FIG. 1E, after the third target selection index is clicked in the selected condition pop-up window, a stock selection page may be notified. The stock selection page may then notify the period module and an index module having a same type, the page is updated based on the clicked index, and the index is located. Since the operation is only a change in the page, the screening condition is not changed, there is no need to request a stock selection result from the backend, and the previous result can be directly used, that is, the recommendation result cannot be changed.

In some embodiments, the method further includes actions at steps D1 to D3, subsequent to the action at step 102 of obtaining the screening information triggered by the user based on the P stock selection indexes to generate the Q stock selection indexes and prior to the action at step 103 of performing the search based on the Q stock selection indexes to obtain the K recommended stocks.

At step D1, a target input region corresponding to an index screening operation is determined.

At step D2, a touch operation in a region other than the target input region is detected.

At step D3, in response to the touch operation meeting a predetermined requirement, an end of a user input is confirmed and the action of the performing the search based on the Q stock selection indexes to obtain the K recommended stocks is performed.

In a specific implementation, a predetermined requirement may be predetermined or system default. A touch operation may be at least one of a click operation, a sliding operation or a pressing operation, which are not limited herein.

Specifically, the electronic device may determine a target input region corresponding to an index screening operation, and then detect a touch operation in a region other than the target input region, and in response to the touch operation meeting a predetermined requirement, confirm an end of a user input, and may perform the action at step 103. By this way, whether the input operation is completed may be detected, and mistaken touch may also be prevented to a certain extent, that is, only the specified operation meets the predetermined requirement.

In a specific implementation, a focus on the page may be monitored. When the user performs an input, the focus may not change. When the user stops to input and clicks any place outside a range of a view where the focus is located, the focus may change, which also indicates the end of the user input. After the focus changes, it may be determined whether an index where the focus is located changes before the focus changes. If the change occurs, a class associated with the index may be notified to perform a corresponding change.

Figure 1F:
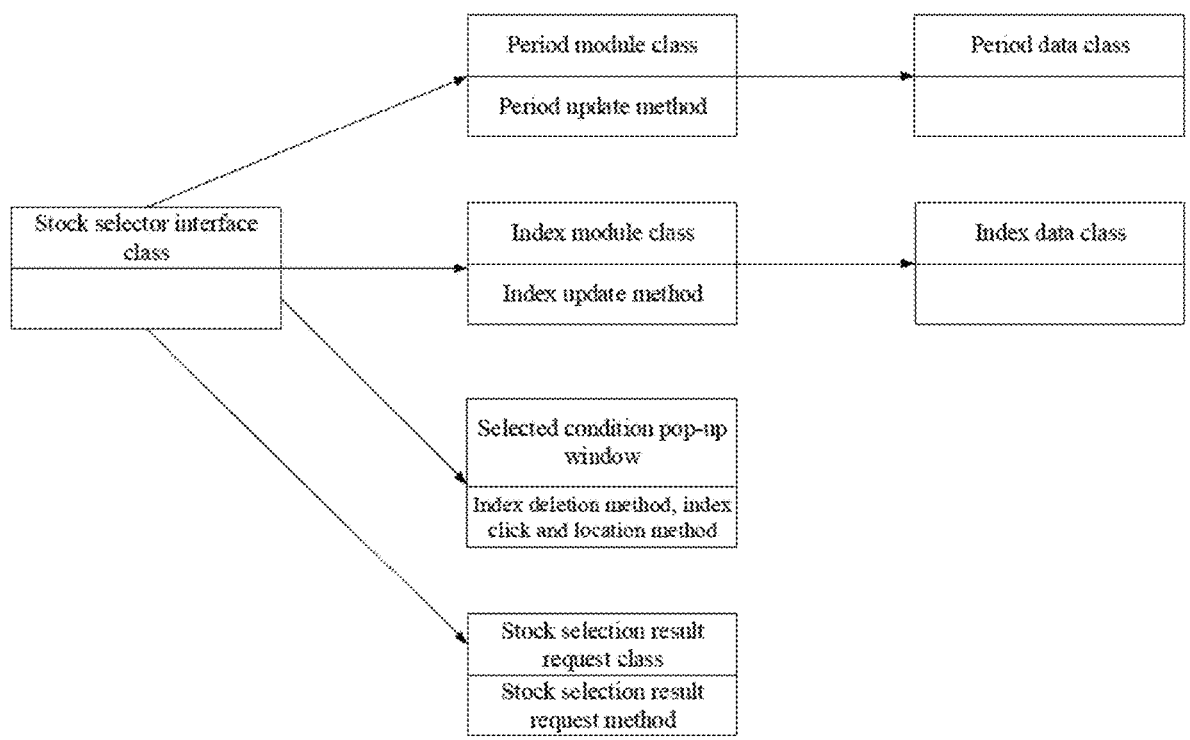
FIG. 1F is a schematic structural view of a stock selector Unified Modeling Language (UML) according to an embodiment of the present disclosure.

In a specific implementation, as illustrated in FIG. 1F, FIG. 1F is a Unified Modeling Language (UML) class diagram (simplified version) of a stock selector.

"Stock selector interface class" is responsible for displaying an interface and bears a responsibility of managing classes such as "index module class", "period module class" and "selected condition pop-up window", and serves as a communication bridge among the classes it manages.

"Index module class" is responsible for displaying an index interface. The index module class includes index sub-modules having different performances. Since different indexes have different performances on the interface and use different data, each sub-module needs to be implemented. The "index module class" may classify respective sub-modules and may perform unified management based on different classifications, and therefore it is not necessary to manage each sub-module. The "stock selector interface class" may be notified in response to a change of an index.

"Period module class" is responsible for displaying a period interface. A change in a period may be generated internally, for example, the user performs period switching; or a change in a period may be generated by an external notification, such as clicking one index in the "selected condition pop-up window".

"Selected condition pop-up window class" is responsible for displaying a selected condition pop-up window. This class has a function of deleting a selected condition, clearing all selected conditions, and locating a selected condition, which is convenient for the user to perform an editing operation.

"Stock selection result request class" is responsible for requesting a stock selection result from the backend. A request process is asynchronous. After the result is returned, the "stock selector interface class" may be notified, thereby completing an update of the stock selection result.

In some embodiments, the method further includes actions at steps at E1 to E4, subsequent to the above-mentioned action at step 10 of performing the search based on the Q stock selection indexes to obtain the K recommended stocks:

At step E1, a target face image of the user is obtained.

At step E2, the target face image is matched with a predetermined face template.

At step E3, in response to the target face image successfully matching the predetermined face template, target user level information corresponding to the predetermined face template is obtained.

At step E4, the K recommended stocks is screened based on the user level information to obtain M recommended stocks, where M is a positive integer smaller than or equal to K.

The predetermined face template may be pre-stored in the electronic device. Different users have different user level information. The target user level information corresponds to stock purchase permission of the user. For example, some users have permission of the Science and Technology Innovation Board (STAR Market), some users have permission of the innovation board, some users have permission of A shares, some users have permission of Hong Kong shares, some users have permission of the US shares, etc. That is, the recommended stocks are not necessarily bought by the users. Furthermore, even if a related stock is recommended, the users may have no interest. Therefore, a corresponding targeted recommendation can be made based on identities of the users.

Specifically, the electronic device can obtain a target face image of the user and match the target face image with a predetermined face template. In response to the target face image successfully matching the predetermined face template, the electronic device can obtain target user level information corresponding to the predetermined face template. Since different user level information may correspond to different purchase permissions, the K recommended stocks may be screened based on the user level information to obtain M recommended stocks, where M is a positive integer smaller than or equal to K. In this way, a corresponding stock recommendation can be realized based on the permission of the user. Conversely, in response to the target face image failing to match the predetermined face template, the K recommended stocks may not be displayed.

In some embodiments, the above-mentioned action at step E2 of matching the target face image with the predetermined face template may include actions at steps E21 to E27.

At step E21, a target shooting parameter corresponding to the target face image is determined.

At step E22, a target time difference between current face recognition and previous face recognition is obtained.

At step E23, a first target adjustment parameter corresponding to the target shooting parameter is determined based on a predetermined mapping relationship between a shooting parameter and a first target adjustment parameter.

At step E24, a second target adjustment parameter corresponding to the target time difference is determined based on a predetermined mapping relationship between a time difference and a second adjustment parameter.

At step E25, a predetermined face recognition threshold is obtained.

At step E26, the predetermined face recognition threshold is adjusted based on the first target adjustment parameter and the second target adjustment parameter to obtain a target face recognition threshold.

E27, the target face image is matched with the predetermined face template based on the target face recognition threshold.

In this embodiment of the present disclosure, the shooting parameter may be at least one of a light sensitivity, an exposure duration, a shooting mode, a white balance parameter, etc., which are not limited herein. The shooting parameter reflects an image quality and an environment condition to a certain extent. Therefore, something about the face image can be reflected to a certain extent by means of the shooting parameter.

The electronic device may pre-store a predetermined mapping relationship between a predetermined shooting parameter and a first adjustment parameter and a predetermined mapping relationship between a time difference and a second adjustment parameter. The shorter the time difference, the more likely it is that a person currently using the device is the user. That is, if the user continues to use the device, there is no need to set a larger threshold to prompt the user to unlock quickly, thereby allowing the user to quickly use the device. The shorter the time difference, the greater the second adjustment coefficient. Conversely, the greater the time difference, the smaller the second adjustment coefficient. The predetermined face recognition threshold may be predetermined or a system default.

Specifically, the electronic device can determine a target shooting parameter corresponding to the target face image; obtain a target time difference between current face recognition and previous face recognition; determine a first target adjustment parameter corresponding to the target shooting parameter based on a predetermined mapping relationship between a shooting parameter and a first adjustment parameter, in which the first adjustment parameter may range from −0.1 to 0.1; and determine a second target adjustment parameter corresponding to the target time difference based on a predetermined mapping relationship between a time difference and a second adjustment parameter, in which the second adjustment parameter may range from 0 to 0.2.

Further, the electronic device can obtain a predetermined face recognition threshold, and then adjust the predetermined face recognition threshold based on the first target adjustment parameter and the second target adjustment parameter to obtain a target face recognition threshold, that is, target face recognition threshold=(1+first target adjustment coefficient)*(1−second target adjustment coefficient).

Further, the electronic device can match the target face image with the predetermined face template to obtain a target matching value. When the target matching value is greater than the target face recognition threshold, it is confirmed that the match succeeds, otherwise, it is confirmed that the match fails.

It can be seen that the target recommendation method described in the embodiments of the present disclosure is applied for the electronic device. The stock selection page including the navigation bar is entered, the navigation bar includes the P stock selection indexes, and P is an integer greater than 1; screening information triggered by the user based on the P stock selection indexes is obtained to generate the Q stock selection indexes, where Q is the positive integer smaller than or equal to P; and the search is performed based on the Q stock selection indexes to obtain the K recommended stocks, where K is the positive integer. In this way, the search can be realized based on the stock selection indexes selected by the user to obtain the corresponding recommended stocks. Therefore, the intelligence of the stock selection can be improved.

Figure 2:
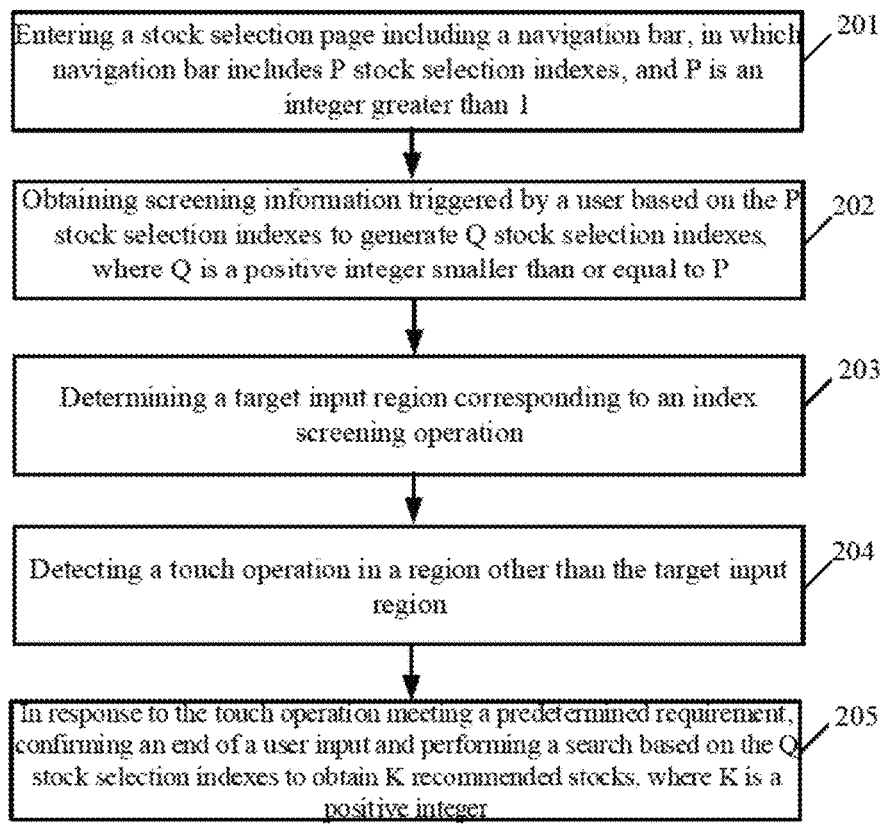
FIG. 2 is a flowchart of another target recommendation method according to an embodiment of the present disclosure.

Consistent with the embodiments illustrated in FIG. 1B, referring to FIG. 2, FIG. 2 is another target recommendation method according to an embodiment of the present disclosure. The method is applied for the electronic device as illustrated in FIG. 1A and specifically includes actions at steps 201 to 205.

At step 201, a stock selection page including a navigation bar is entered. The navigation bar includes P stock selection indexes, and P is an integer greater than 1.

At step 202, screening information triggered by a user based on the P stock selection indexes is obtained to generate Q stock selection indexes. Q is a positive integer smaller than or equal to P.

At step 203, a target input region corresponding to an index screening operation is determined.

At step 204, a touch operation in a region other than the target input region is detected.

At step 205, in response to the touch operation meeting a predetermined requirement, an end of a user input is confirmed and a search is performed based on the Q stock selection indexes to obtain K recommended stocks. K is a positive integer.

Specific description of the actions at steps 201 to 205 may refer to the corresponding actions at steps of the target recommendation method described in FIG. 1B, and details thereof are not repeated herein.

It can be seen that the target recommendation method described in the embodiments of the present disclosure is applied for the electronic device. The stock selection page including the navigation bar is entered, the navigation bar includes the P stock selection indexes, and P is an integer greater than 1; screening information triggered by the user based on the P stock selection indexes is obtained to generate the Q stock selection indexes, where Q is the positive integer smaller than or equal to P; a target input region corresponding to an index screening operation is determined; a touch operation in a region other than the target input region is detected; and in response to the touch operation meeting a predetermined requirement, an end of a user input is confirmed and the search is performed based on the Q stock selection indexes to obtain the K recommended stocks, where K is the positive integer. In this way, the search can be realized based on the stock selection indexes selected by the user to obtain the corresponding recommended stocks. Therefore, the intelligence of the stock selection can be improved.

Figure 3:
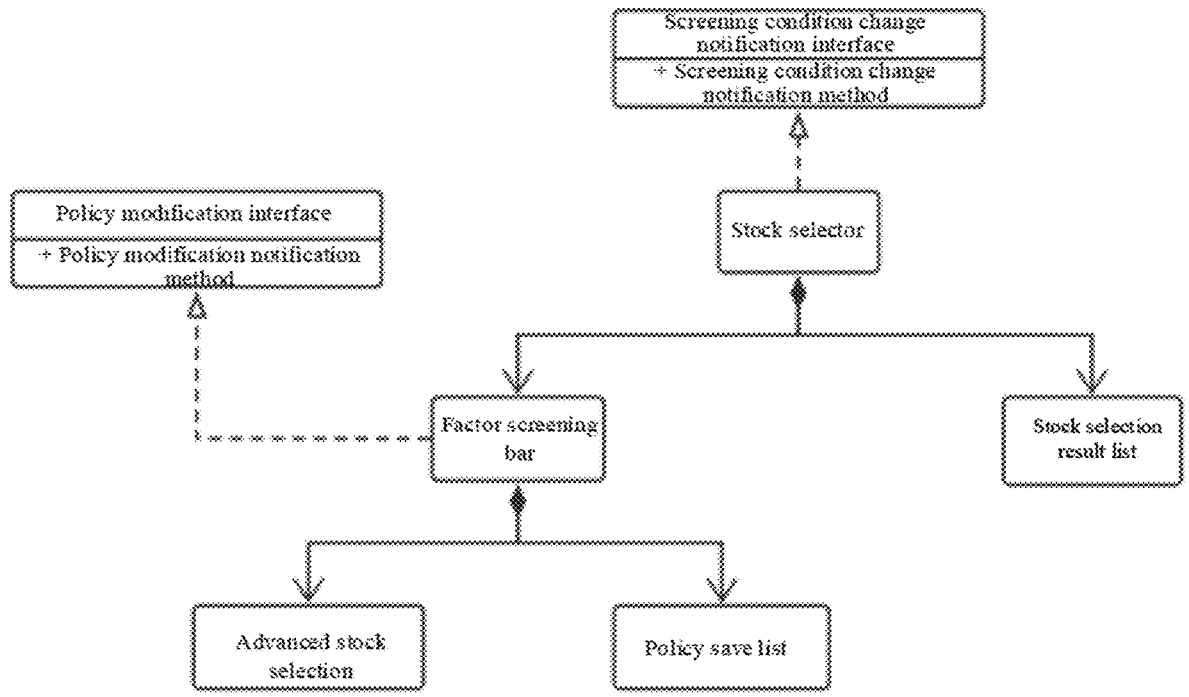
FIG. 3 is a schematic structural view of another stock selector UML according to an embodiment of the present disclosure.

The present disclosure adds a new function based on the stock selector illustrated in FIG. 1F. Referring to FIG. 3, FIG. 3 is another stock selector according to an embodiment of the present disclosure (this stock selector only illustrates a module corresponding to a newly added function), which is specifically described as follows.

In a UML class diagram of the stock selector (a simplified version), the "stock selector" is a bearer window of the whole stock selection page, and two sub-windows are embedded, which are "factor screening bar" and "stock selection result list", respectively.

The "factor screening bar" (i.e., a conditional stock selection menu) controls screening of the market, boards, market indexes, financial indexes, and technical indexes. When the screening condition changes, the "stock selection result list" needs to be notified. Since the "factor screening bar" and the "stock selection result list" are independent from each other and not associated with each other, "screening condition change interface" is designed. The interface is implemented by the "stock selector". A user screening condition is forwarded to the "stock selection result list", and then a request is sent to a market service to display corresponding data.

"Policy save list" (i.e., my policy list) displays a policy saved by the user, and supports deletion, modification, and replication policies. When the user modifies a certain policy, it is necessary to perform a reverse display of this policy to the "factor screening bar". Since the "factor screening bar" and the "policy save list" are in a combination relationship, "policy modification interface" is designed. The interface is implemented by the "factor screening bar". A policy identity document (ID) modified by the user is callback to the "factor screening bar", and the screening condition is obtained by means of the policy ID to perform the reverse display.

"Advanced stock selection" (i.e., an advanced stock selection page) has a richer stock selection function than the "factor screening bar". The "advanced stock selection" provides a search function, and the user may search for a stock selection factor based on a keyword. Moreover, the "advanced stock selection" supports a user-defined stock selection condition, a financial index support year and a period stock selection. Most indexes may be used to select a stock based on a continuous period and a cumulative period. The set screening condition may be synchronized to the "factor screening bar" in real time.

The "stock selection result list" displays stock selection data and can dynamically display a factor data column based on the screening condition set by the user, thereby enriching user experience.

An overall structure of the stock selector in this embodiment is clear, and each module has a single responsibility and does not interfere with each other. The modules interact through a pure virtual interface. There is no coupling phenomenon, and it is easy to expand.

Figure 4:
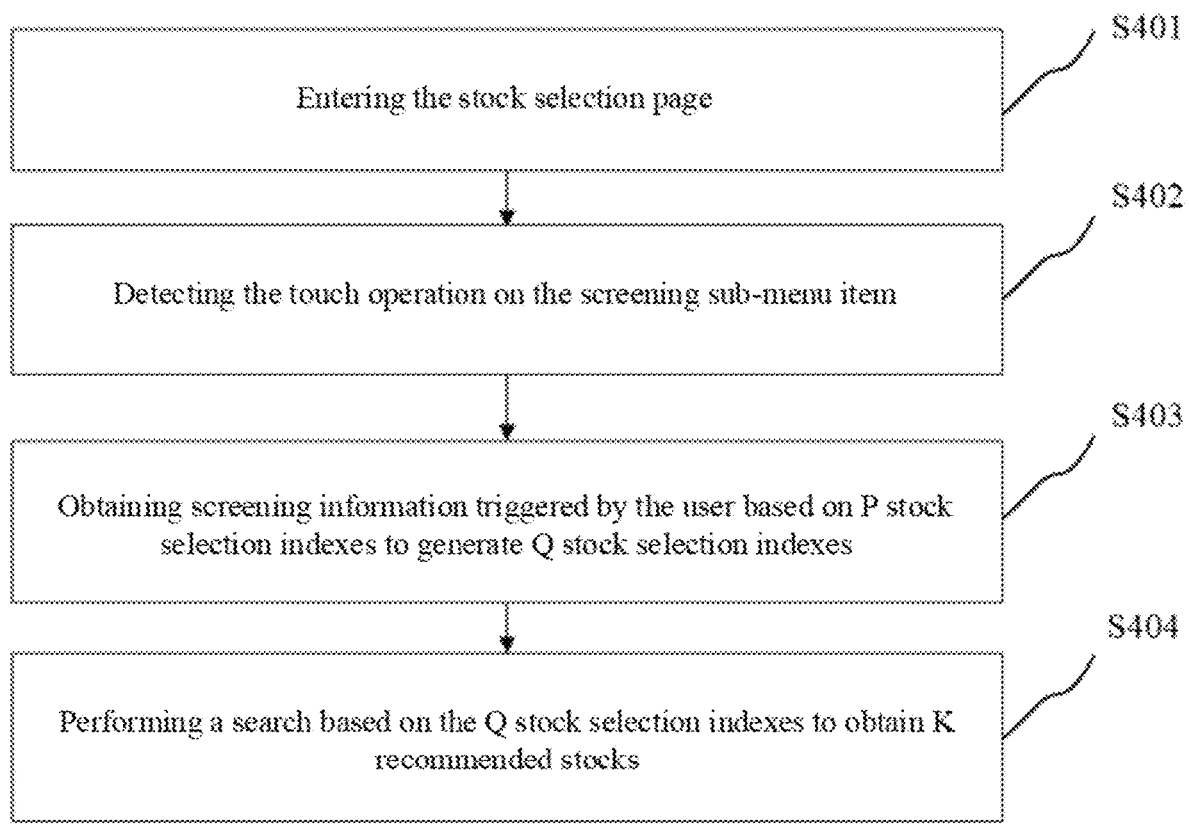
FIG. 4 is a flowchart of another target recommendation method according to an embodiment of the present disclosure.

Based on the stock selector illustrated in FIG. 1F and FIG. 3, an embodiment of the present disclosure provides another target recommendation method. As illustrated in FIG. 4, the method is applied for the electronic device as illustrated in FIG. 1A and specifically includes actions at steps 401 to 404.

At step 401, the stock selection page is entered.

At step 402, the touch operation on the screening sub-menu item is detected.

At step 403, screening information triggered by the user based on P stock selection indexes is obtained to generate Q stock selection indexes.

At step 404, a search is performed based on the Q stock selection indexes to obtain K recommended stocks.

Figure 5:
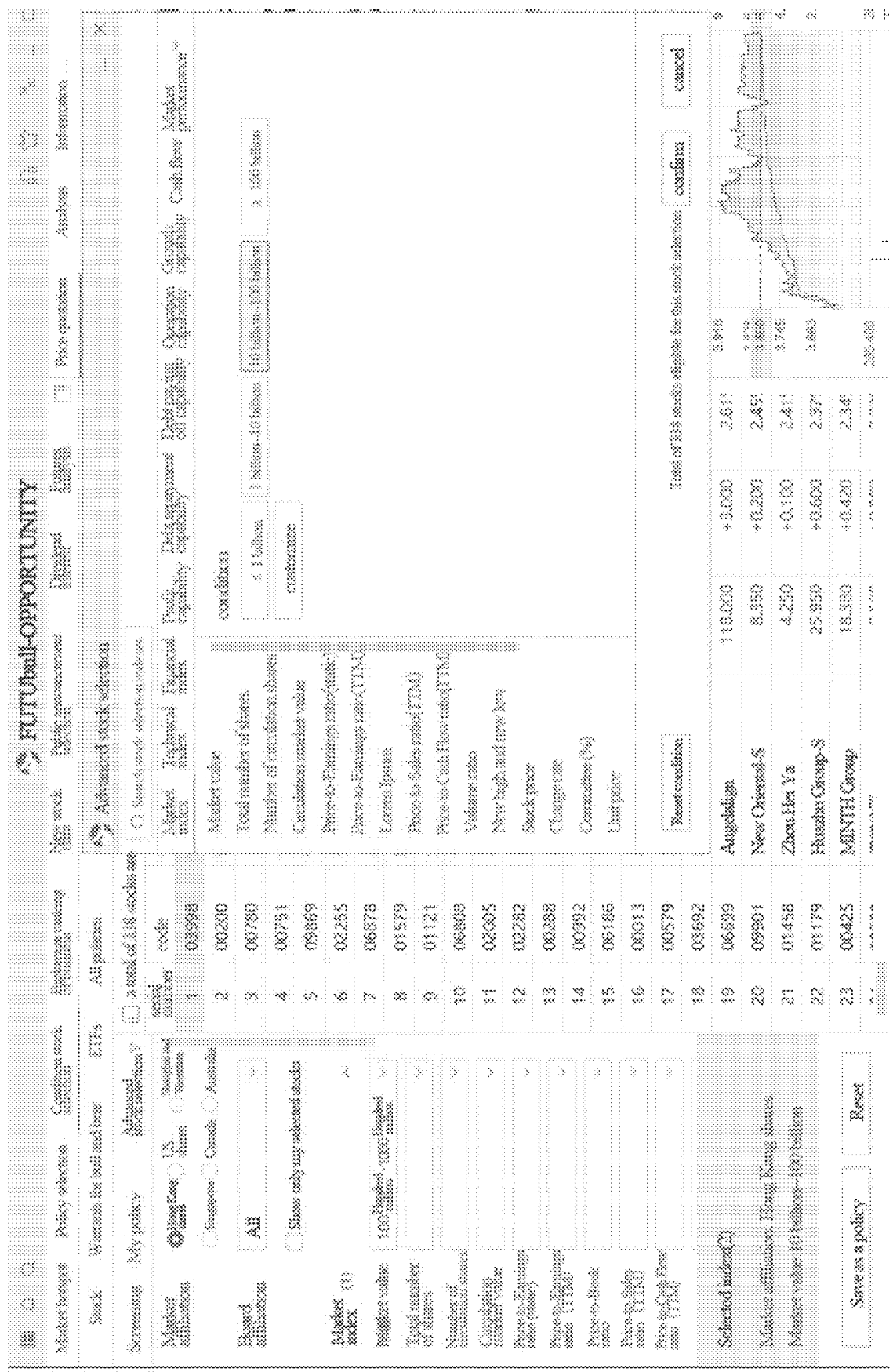
FIG. 5 is a schematic diagram of a stock selection page according to an embodiment of the present disclosure.

FIG. 5 is a stock selection page according to an embodiment of the present disclosure. As illustrated in FIG. 5, a stock selection page is provided with a navigation bar. The navigation bar includes a plurality of menus, such as a market hotspot menu, a policy selection menu, a condition stock selection menu, a brokerage ranking, etc. The above-mentioned menu further includes a subordinate multi-level menu, and therefore the user can easily perform the stock selection or other operations through menus at all levels. In this way, in addition to enriching a content of the stock selection page to allow the user to efficiently and conveniently perform the stock selection operation, the user experience is improved.

A menu as a condition stock selection menu is taken as an example for description of the target recommendation method of the present disclosure, which is specifically as follows. When entering the stock selection page, the user clicks the condition stock selection menu, and the stock selection page displays a plurality of menu items of the condition selection menu, such as a stock menu item, an exchange-traded funds (ETfs) menu item, etc. When the user clicks the stock menu item again, the stock selection page displays a plurality of sub-menu items of the stock menu item, such as a screening sub-menu item, a my policy sub-menu item, an advanced stock selection sub-menu item, etc. The screening sub-menu item includes P stock selection indexes, such as market affiliation, board affiliation, market indexes, etc. P is an integer greater than 1.

After the above-mentioned operations, the electronic device detects the touch operation on the screening sub-menu item, and the selection page displays the P stock selection indexes under the screening sub-menu item. The Q stock selection indexes are generated by obtaining the screening information triggered by the user based on the P stock selection indexes, and then the search is performed based on the Q stock selection indexes to obtain the K recommended stocks. Q is a positive integer smaller than or equal to P, and K is a positive integer.

Figure 6:
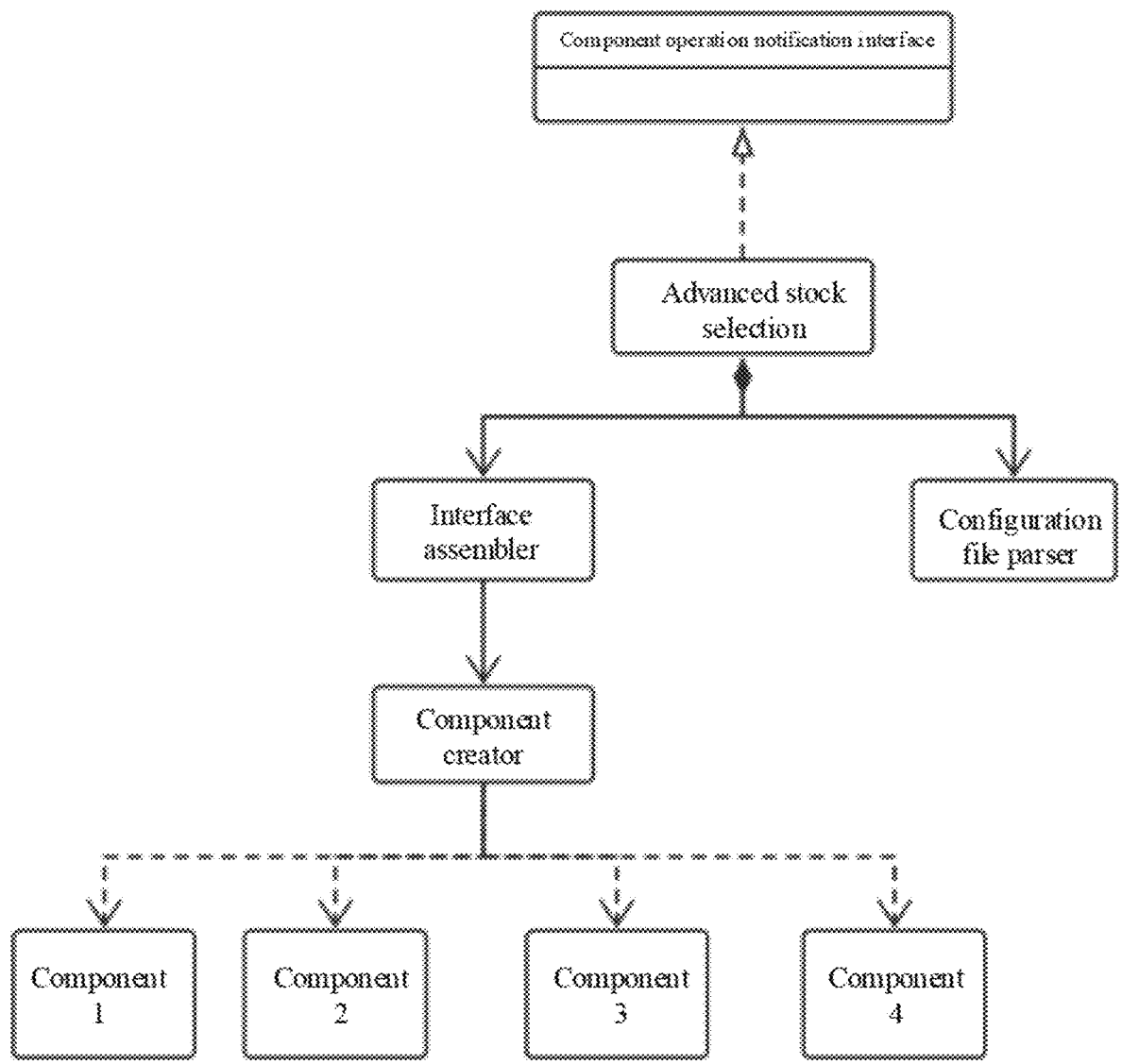
FIG. 6 is a schematic structural view of an advanced selector according to an embodiment of the present disclosure.
Figure 7:
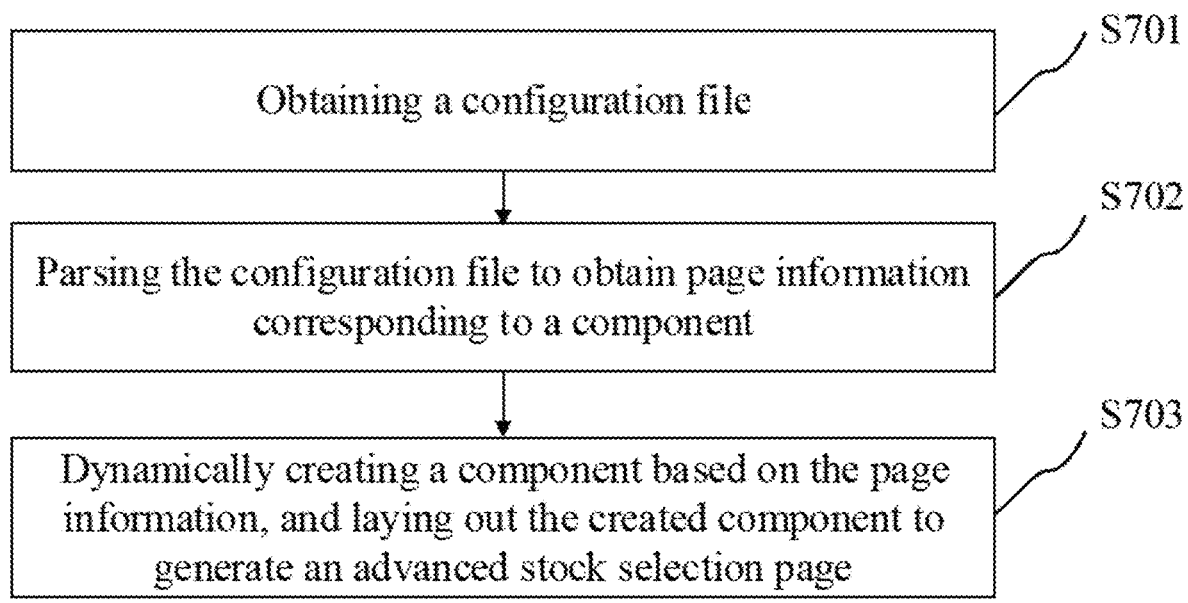
FIG. 7 is a flowchart of a method for generating an advanced stock selection page according to an embodiment of the present disclosure.

Based on an advanced stock selector illustrated in FIG. 6, an embodiment of the present disclosure provides a method for generating an advanced stock selector page. As illustrated in FIG. 7, the method is applied for the electronic device as illustrated in FIG. 1A and specifically includes actions at steps 701 to 703.

At step 701, a configuration file is obtained.

At step 702, the configuration file is parsed to obtain page information corresponding to a component.

At step 703, the component is dynamically created based on the page information, and the created component is laid out to generate an advanced stock selection page.

The advanced stock selection page is a display page corresponding to the advanced stock selection menu item.

FIG. 6 is a UML class diagram of an advanced stock selector (a simplified version), an advanced stock selector interface is generated through control componentization and the configuration file. Specifically, the configuration file records a component and component information used in each sub-page and allocates an ID to the component of each page as a Key value to distinguish attribution of the component. A relationship between the page and the component, "configuration file parser", is used to parse the configuration file to generate page information of the component. "Interface componentizer" dynamically creates components based on the page information parsed by the "configuration file parser" and lays the components out. At last, an advanced stock selection page is generated.

Figure 8:
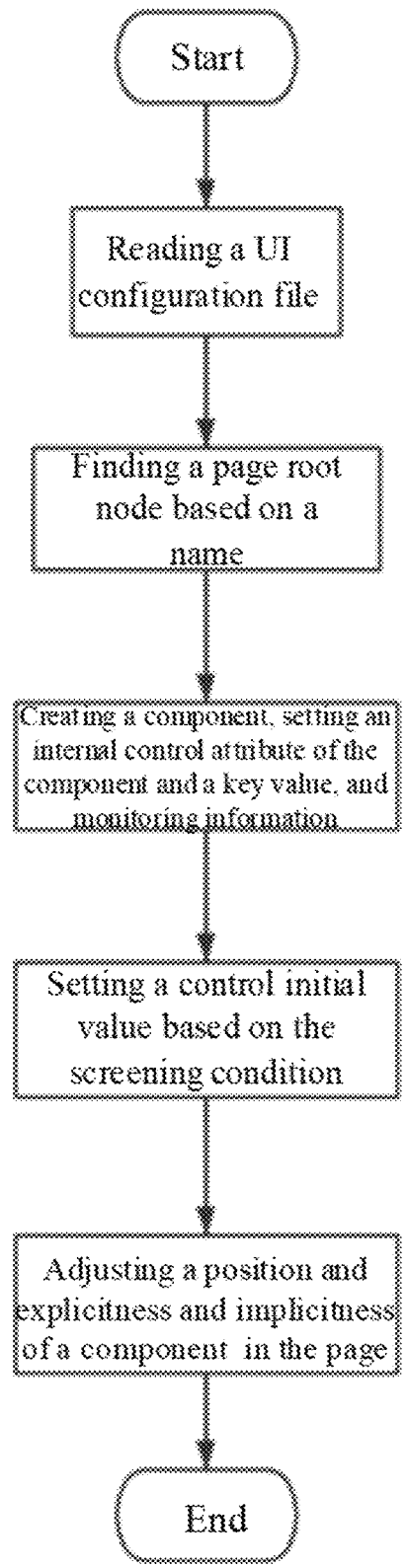
FIG. 8 is a flowchart of a method for loading an advanced stock selection page according to an embodiment of the present disclosure.

In addition, as illustrated in FIG. 8, the present disclosure further provides a method for loading an advanced stock selection page. The method includes actions at the following specific steps, a User Interface (UI) configuration file is read. Then, a page root node is found based on a name in the UI configuration file. Then, a component is created, an internal control attribute of the component is set, and a control initial value is set based on the screening condition. At last, a position and explicitness and implicitness of the component in the page are adjusted based on the created component, the control attribute, and the initial value.

Figure 9:
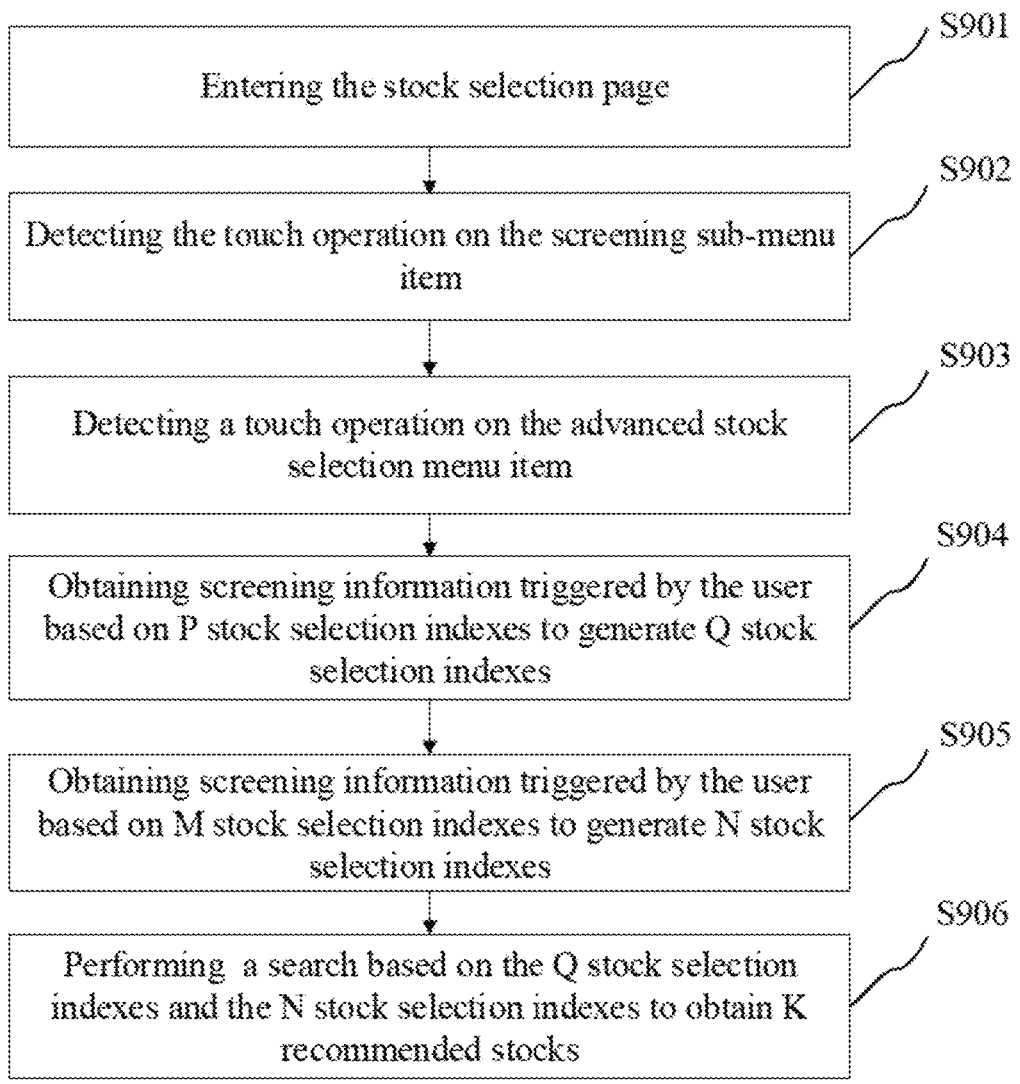
FIG. 9 is a flowchart of another target recommendation method according to an embodiment of the present disclosure.

Based on the advanced stock selector illustrated in FIG. 6, referring to FIG. 9, FIG. 9 is another target recommendation method according to an embodiment of the present disclosure. The method is applied for the electronic device illustrated in FIG. 1A and specifically includes actions at steps 901 to 906.

At step 901, the stock selection page is entered.

At step 902, the touch operation on the screening sub-menu item is detected.

At step 903, a touch operation on the advanced stock selection menu item is detected.

At step 904, screening information triggered by the user based on P stock selection indexes is obtained to generate Q stock selection indexes.

At step 905, screening information triggered by the user based on M stock selection indexes is obtained to generate N stock selection indexes.

At step 906, a search is performed based on the Q stock selection indexes and the N stock selection indexes to obtain K recommended stocks.

On the basis of the previous embodiment, in combination with FIG. 5, since the stock menu item further includes an advanced stock selection menu item including M stock selection indexes, after the electronic device detects a touch operation on the advanced stock selection menu item, screening information triggered by the user based on M stock selection indexes is obtained to generate N stock selection indexes, where N is smaller than or equal to M. Then, a search is performed based on the Q stock selection indexes and the N stock selection indexes to obtain K recommended stocks.

It should be noted that step 904 and step 905 may be performed sequentially or simultaneously, and in addition, the advanced stock selection menu has more stock selection indexes than selected stock indexes in the screening menu, that is, M is greater than P.

Figure 10:
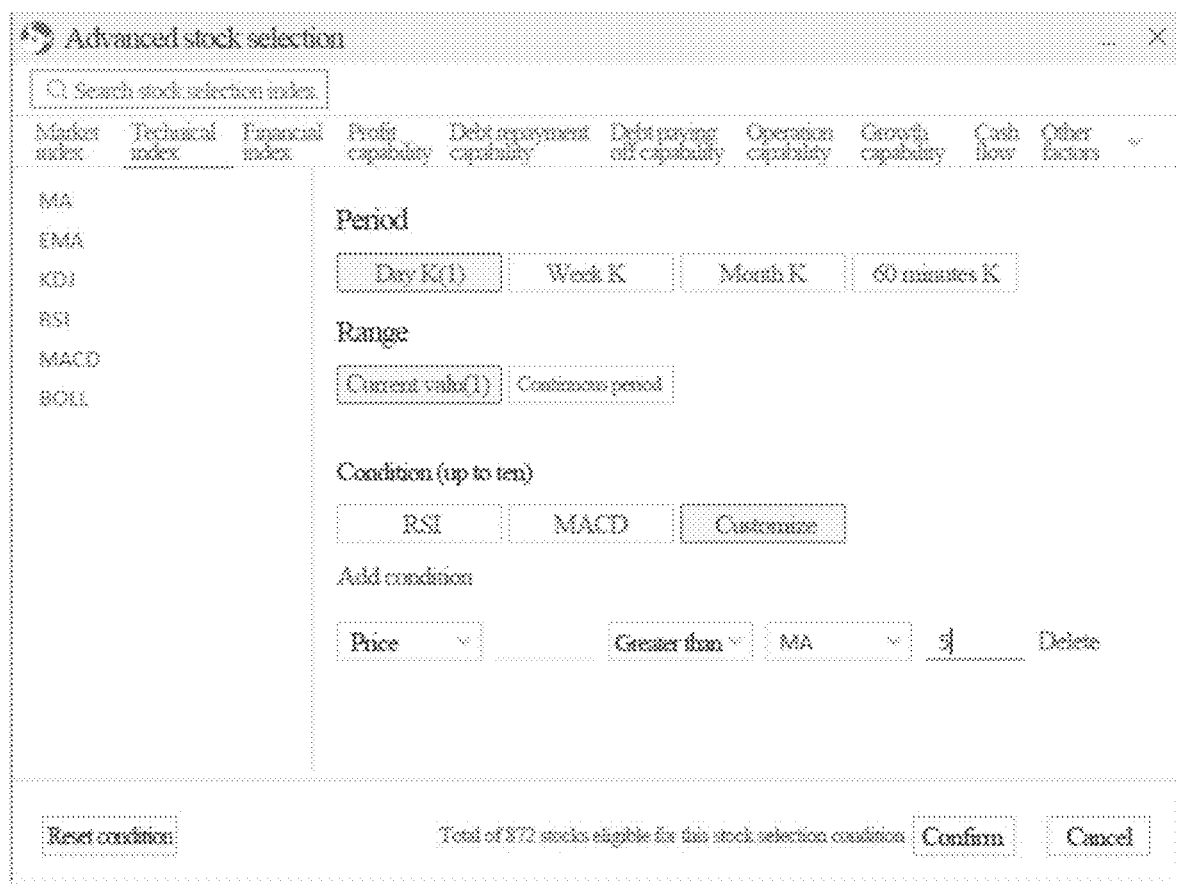
FIG. 10 is a schematic diagram of an advanced stock selection page according to an embodiment of the present disclosure.

In addition, any one of the P stock selection indexes and the M stock selection indexes has a corresponding screening condition including a custom screening condition and a non-custom screening condition. Specifically, as illustrated in FIG. 10, a technical index in the advanced stock selection page has a corresponding screening condition, such as a period, a range, a condition, etc. The period and the range are selected by setting a plurality of options, which belong to the non-custom screening condition. However, the condition may add a condition by a custom option. That is, setting a price and other factors by himself/herself, and therefore the condition is a custom screening condition.

Figure 11:
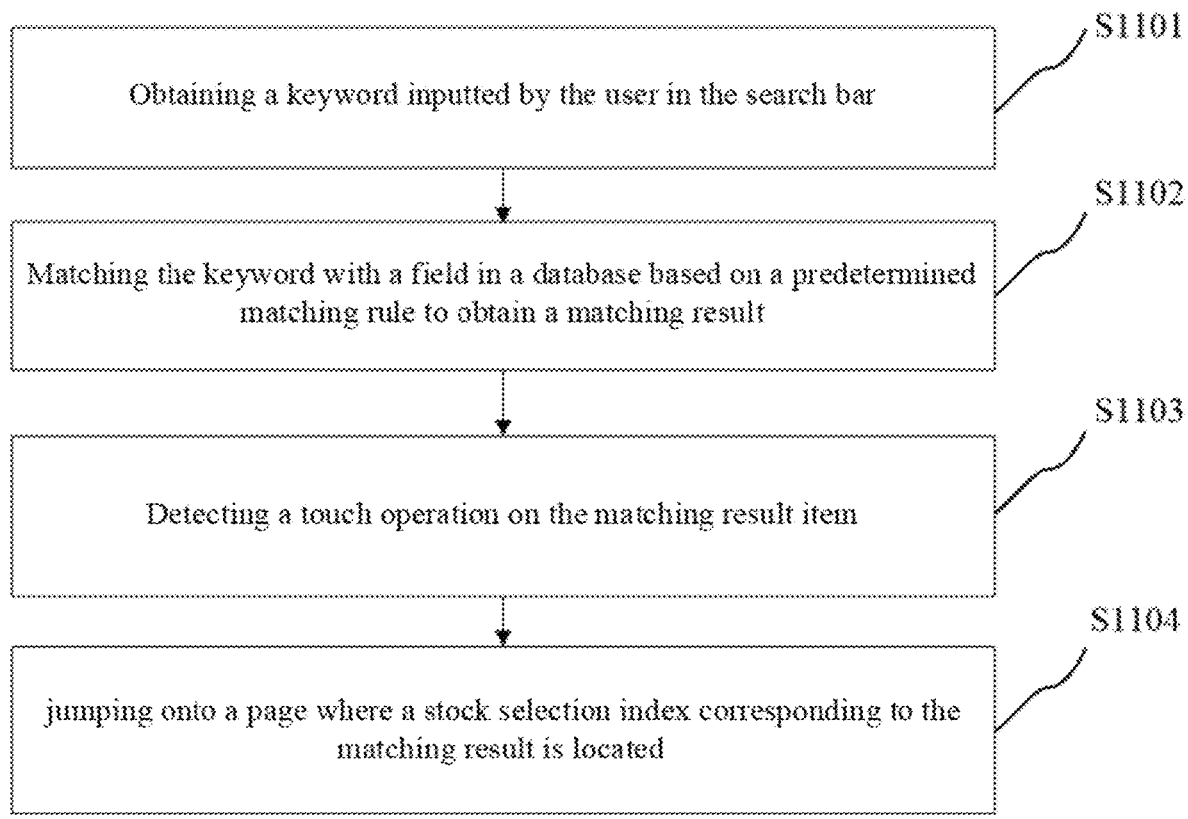
FIG. 11 is a flowchart of a searching method for a stock selection index according to an embodiment of the present disclosure.

In an embodiment, the advanced stock selection page according to the embodiments of the present disclosure includes a search bar and a matching result item, and a search of a stock selection index can be realized through the search bar and the matching result item. As illustrated in FIG. 11, the operation includes actions at steps 1101 to 1104.

At step 1101, a keyword inputted by the user in the search bar is obtained.

At step 1102, the keyword is matched with a field in a database based on a predetermined matching rule to obtain a matching result. The matching result is displayed based on a predetermined priority order.

At step 1103, a touch operation on the matching result item is detected.

At step 1104, a page where a stock selection index corresponding to the matching result is located is jumped onto.

A keyword may be inputted into the search bar. A keyword used in the search and the matching at least includes: index name, pinyin, short pinyin (pinyin initial letter), Trailing Twelve Months (TTM), growth rate, profit, ratio, income, Advance Decline Ratio (ADR), option, warrant, futures, AH shares, etc. The predetermined priority order is: (complete matching, index name)>(complete matching, keyword)>(complete matching, pinyin)>(complete matching, short pinyin)>(first matching, index name)>(first matching, pinyin)>(first matching, keyword)>(non-first matching, pinyin)>(non-first matching, keyword)>(non-first matching, index name). The (complete matching, A) refers to that a content inputted by the user in the search bar is consistent with an A. The A may be an index name, pinyin or short pinyin, etc. If the A is an index name, (complete matching, A)=(complete matching, pointer name) refers to that a content inputted by the user in the search bar is consistent with the index name (i.e., complete matching). For example, an index name is referred to as "market value", and if the user inputs the "market value" in the search bar, the "market value" is completely matched and is displayed at a top of a matching result. The (first matching, B) refers to that a content inputted by the user in the search bar is consistent with a first keyword of a B. The B may be a pointer name, a pinyin or a keyword, etc. If the B is an index name, (first matching, B)=(first matching, the pointer name) refers to that a content inputted by the user in the search bar matches a first keyword of the pointer name (i.e., the first matching). For example, if the user inputs a "market" in the search bar, all pointer names with a beginning of the "market" are displayed in the matching result. The (non-first matching, C) refers to that a content inputted by the user in the search bar is partially consistent with C and is not first matching with C. The C may be a pointer name, a pinyin or a keyword, etc. If a C is an index name, (non-first matching, C)=(non-first matching, index name) refers to that a content inputted by the user in the search bar matches a part of the index name and is the non-first matching. For example, the index name is referred to as "market value", if the user inputs a "value" in the search bar, the "market value" is a non-first matching and is displayed at a lowermost part of the matching result based on the default priority order.

Figure 12:
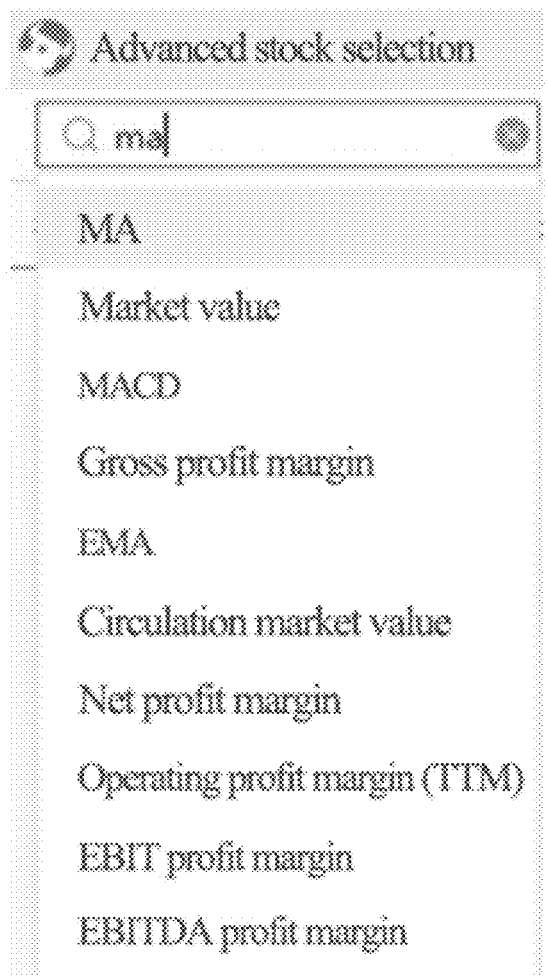
FIG. 12 is a schematic diagram of searching a stock selection index in an advanced stock selection page according to an embodiment of this application.

Due to a large number of factors in the stock selector, in order to improve efficiency of the index search by the user, the present disclosure adds a search function. As illustrated in FIG. 12, a search entry (i.e., the search bar) is at an upper left of the advanced stock selection page. In all language environments, matching rules such as simplified Chinese, traditional Chinese, English, and pinyin are supported. After an input, a field is searched and matched in a built-in database. That is, a search is performed on the content inputted in the search bar one by one based on all matching rules, such as pinyin matching, English matching, simplified Chinese matching, traditional Chinese matching, etc. At last, all matching results corresponding to all the matching rules are outputted. With reference to FIG. 12, after an ma is inputted into the search bar, search results outputted based on the pinyin matching include MA (Moving Average), MACD (Moving Average Convergence/Divergence), and EMA (Exponential Moving Average), and search results outputted based on the English matching include market value, gross profit margin, circulation market value, net profit margin, operating profit margin, EBIT profit margin, and EBITDA profit margin. In addition, there is an empty search result outputted through the simplified Chinese matching and the traditional Chinese matching. That is, a relevant content is not searched through the simplified Chinese matching and the traditional Chinese matching.

Since screening condition factors supported by each market are different (such as pre-market trading and after-hour trading for US stocks), a search result only displays a stock selection index supported by a current screening market. The search result item is clicked to jump onto a page where a corresponding stock selection index is located in an advanced stock selection window.

In an embodiment, after the K recommended stocks are generated, the electronic device monitors the stock selection index, and the stock selection result list is updated after a screening condition corresponding to the stock selection index is changed. Specifically, whether a target stock selection index with a changed screening condition exists in the P stock selection indexes and the M stock selection indexes is monitored; in response to the target stock selection index with the changed screening condition existing in the P stock selection indexes and the M stock selection indexes, a screening condition of the target stock selection index is updated, and the updated screening condition is sent to an initial stock selection result list corresponding to the K recommended stocks to generate a target stock selection result list.

Further, subsequent to the generating the target stock selection result list, the electronic device further displays the target stock selection result list through the stock selection page, and actions at specific steps are as follows. The navigation bar further includes a stock selection result list menu, and a touch operation on the stock selection result list menu is detected (i.e., clicking the stock selection result list menu by the user). Then, a list update request is sent to a backend based on the touch operation on the stock selection result list menu. At last, the target stock selection result list is obtained and displayed based on the list update request.

Figure 13:
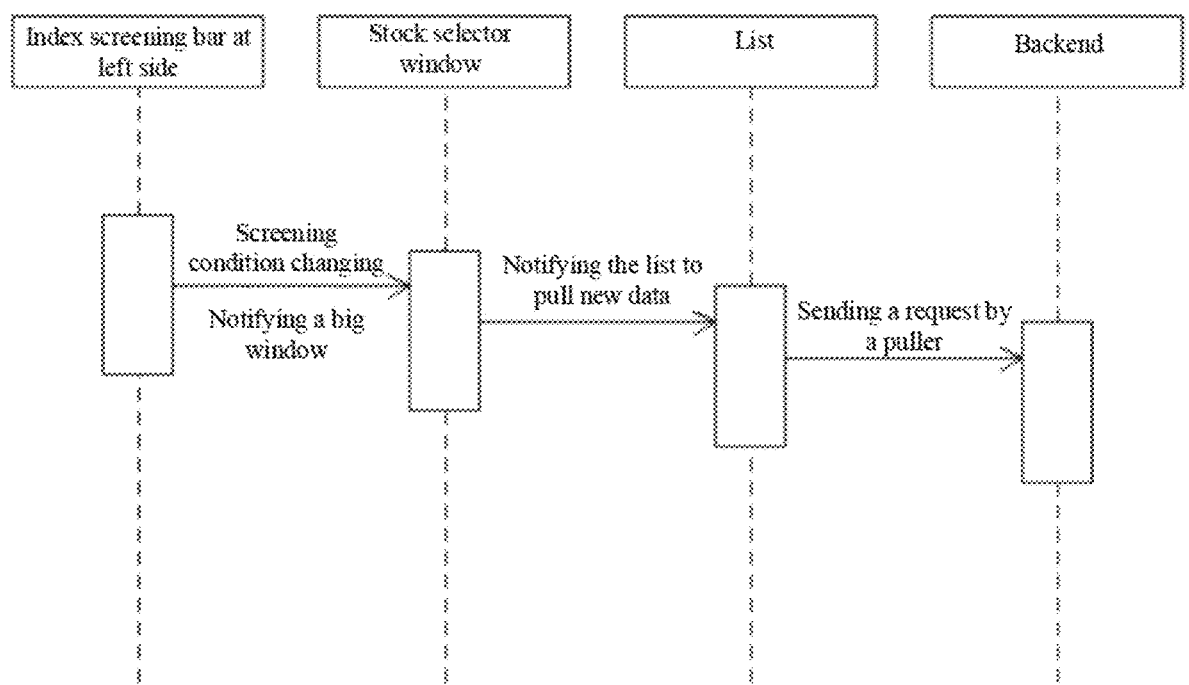
FIG. 13 is a flowchart of a method for updating a stock selection result list according to an embodiment of the present disclosure.

With reference to FIG. 13, a process of displaying the target selection result list is illustrated by taking the P stock selection indexes in the screening sub-menu items as an example. Specifically, whenever the screening condition corresponding to the stock selection index changes, a new condition (i.e., the changed screening condition) is saved into a data layer. When the electronic device monitors that a screening condition corresponding to any one of the P stock selection indexes in an index screening bar at the left side of the stock selection page (i.e., the screening sub-menu item) changes, the stock selector window notifies the initial stock selection result list downwards, and the initial stock selection list pulls the new condition from the data layer and then transmits the new condition to an internal puller. Then, the puller initiates a list update request to the backend. At last, the target stock selection result list is obtained and displayed based on the list update request.

After the display of the target stock selection result list is realized through the above embodiment, a stock parameter in the target stock selection result list need to be determined. If the stock parameter is not a predetermined parameter, a name of the stock parameter and a value of the stock parameter are self-defined through the touch operation. The target stock selection list at least includes the name of the stock parameter and the value of the stock parameter.

Figure 14:
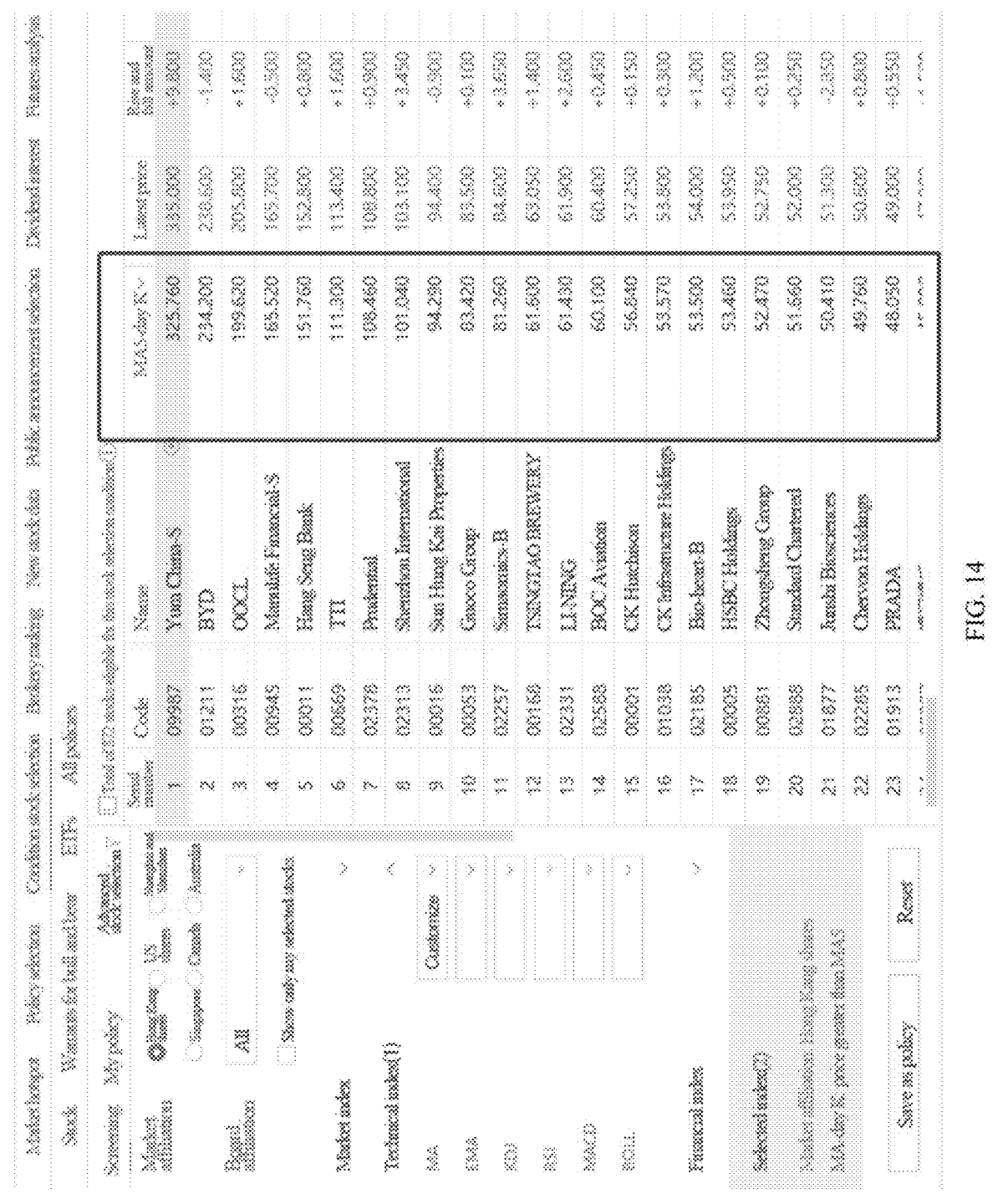

The target stock selection list and setting of the stock parameter in the target stock selection result list are described below in combination with specific embodiments. As illustrated in FIG. 14, after entering the stock selection page, the user clicks market affiliation and a technical index under the screening sub-menu item to customize Hong Kong shares under the market affiliation and an MA under the technical index. A selected index and a screening condition corresponding to the selected index are displayed at a lower left corner of the stock selection page by selecting and setting the screening condition corresponding to the above-mentioned market affiliation and the above-mentioned technical index.

After setting the above-mentioned selected index and issuing a request and other operations, a right side of the stock selection page displays the screening condition corresponding to the selected index to generate and display a target stock selection result list. Each column in the target stock selection result list has a "column identifier" attribute represented by a number, the column identifier is used to determine which screening condition the column belongs to, and all columns of information are recorded in an "array" data structure. In addition, the target stock selection result list displays, by default, 34 basic common stock parameters (such as stock name, code, latest price, change rate, rise and fall amount, etc.), and also supports automatic addition and display of a user-defined screening condition.

When a user sets a screening condition, it is first confirmed whether the stock parameter is a default column factor (i.e., a predetermined parameter), in response to confirming that the stock parameter is not the default column factor, the stock parameter is recorded as a custom factor (i.e., a custom parameter) and assigned with a special column identifier (for example, in a Hong Kong stock market, the default column factor has column identifiers that are all below 1000. However, in order to distinguish from the default column factor, a custom factor is assigned with a value ranging from 2000 to 4000, and then an "array" data structure is used to store information of the custom column factor. When the list is created, corresponding columns will be respectively created for the default column factor and all factors (parameters) stored in the custom factor array and all support header field sorting.

In an embodiment, the stock menu item according to the embodiments of the present disclosure further includes a "my policy" sub-menu item, which can save the stock selection index, and specifically, a target policy is generated and saved based on the Q stock selection indexes and the N stock selection indexes, or the Q stock selection indexes.

When the user clicks the screening sub-menu item, by setting a screening condition of the Q selection indexes in the screening sub-menu item, and then saving the screening condition, a target policy corresponding to the screening condition is generated and saved.

After the target policy is generated and saved, the target policy may also be displayed and updated. Actions at steps of displaying the target policy are as follows. A touch operation on the my policy sub-menu item is detected. Then, a policy request is sent to a backend based on the touch operation on the my policy sub-menu item. Then, data corresponding to the target policy is obtained based on the policy request. At last, a name and a date corresponding to the target policy are displayed on a display page corresponding to the my policy sub-menu item.

Figure 15:
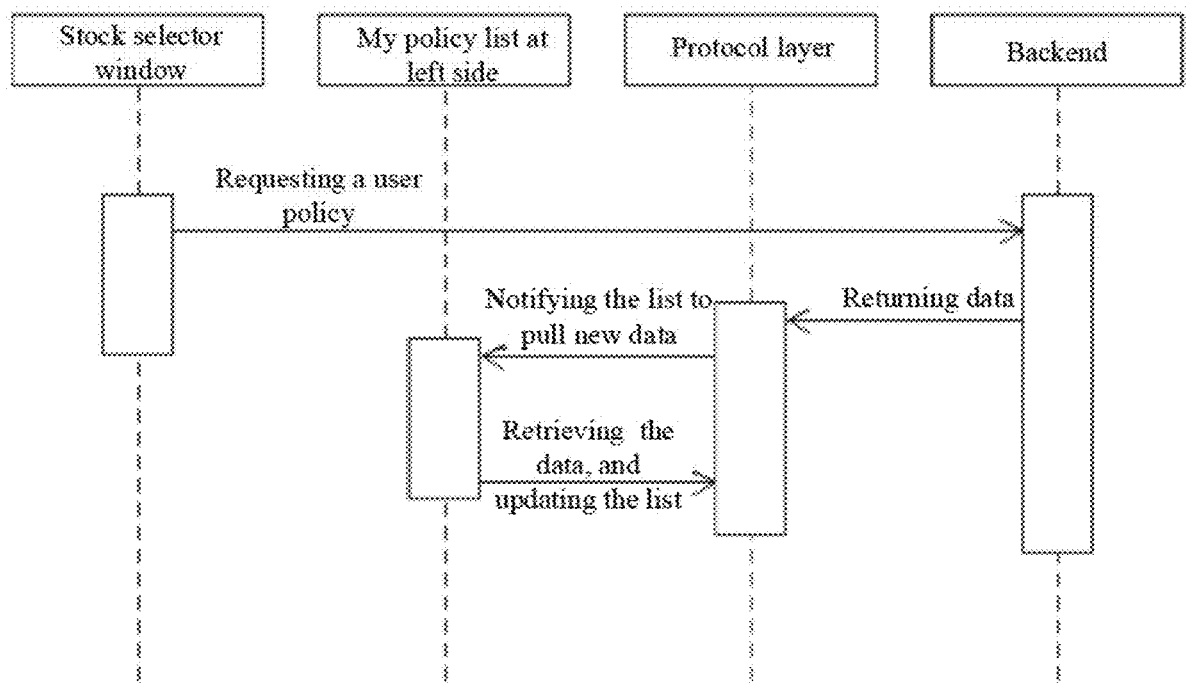
FIG. 15 is a flowchart of a method for updating a stock selection policy according to an embodiment of the present disclosure.

After the target policy is displayed, the user may update the target policy by means of the touch operation. Specifically, referring to FIG. 15, when the electronic device detects the touch operation on the my policy sub-menu item (i.e., receiving a policy update request of the user), a policy update request is sent to the backend, and the backend feeds back new data corresponding to the target policy to a protocol layer based on the policy update request. Furthermore, the protocol layer notifies a my policy list to pull the new data corresponding to the target policy. Then, the my policy list pulls the new data corresponding to the target policy from the protocol layer to update the my policy list.

In addition, after the target policy is displayed through the my policy list, a touch operation may be performed on the my policy list to realize editing, copying, deleting, etc., of the target policy. The my policy list includes a display box corresponding to the target policy, and actions at the specific steps are as follows. A floating touch operation on the target policy is detected; and an operation identifier for the target policy is displayed in a display box corresponding to the target policy. The operation identifier at least includes editing, copying, deleting, and more. The more is configured to be unfolded to display all screening conditions in the target policy, and a number of all screening conditions is greater than a predetermined number.

Figure 16:
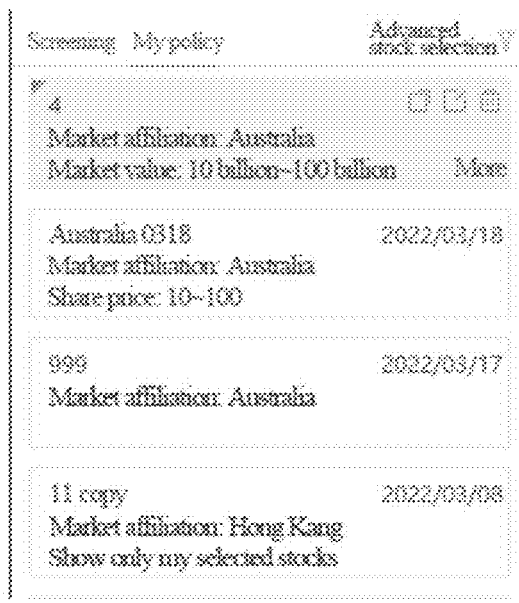
FIG. 16 is a schematic diagram of a my policy page according to an embodiment of the present disclosure.

Specifically, referring to FIG. 16, the my policy list displays four policies. Assuming that a first policy is set as the target policy, when a mouse floats on a display box corresponding to the target policy, an upper right of the display box displays three identifiers, that is, copying, editing and deleting. If there is a large number of screening conditions in the target policy (i.e., greater than the predetermined number), a "more" identifier appears at a lower right of the display box. After clicking the "more", a content of the target policy is unfolded downwards (or upwards, depending on whether there is enough display control below), and all screening conditions set by the target policy can be completely viewed after the target policy content is unfolded.

It should be noted that switching between a plurality of policies may also be performed by clicking on the mouse, and after switching, the my policy list may display the screening data result under the current policy accordingly.

Figure 17:
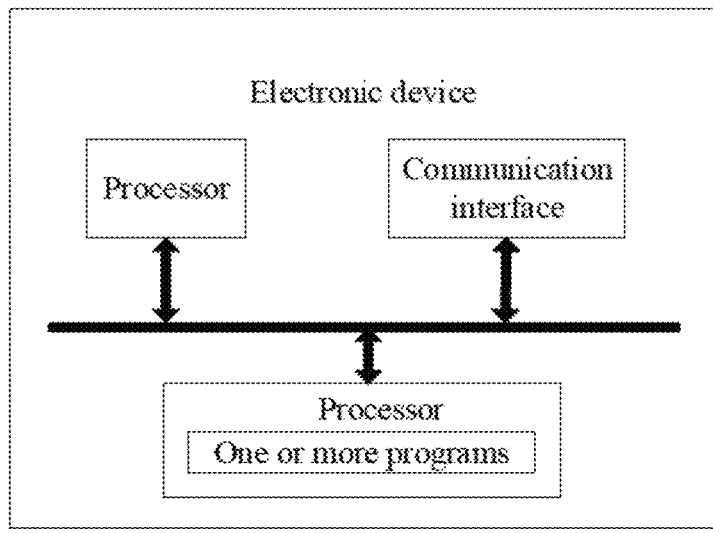
FIG. 17 is a schematic structural view of an electronic device according to an embodiment of the present disclosure.

Consistent with the above-mentioned embodiments illustrated in FIG. 1B and FIG. 2, referring to FIG. 17, FIG. 17 is a schematic structural view of an electronic device according to an embodiment of the present disclosure. As illustrated in FIG. 17, the electronic device includes a processor, a memory, a communication interface, and one or more programs. The above-mentioned one or more programs are stored in the memory and configured to be executed by the processor. The above-mentioned one or more programs include instructions configured to perform actions at the following steps of: entering a stock selection page including a navigation bar, in which the navigation bar includes P stock selection indexes, and P is an integer greater than 1; obtaining screening information triggered by a user based on the P stock selection indexes to generate Q stock selection indexes, where Q is a positive integer smaller than or equal to P; and performing a search based on the Q stock selection indexes to obtain K recommended stocks, where K is a positive integer.

In some embodiments, in the aspect of the action of obtaining the screening information triggered by the user based on the P stock selection indexes to generate the Q stock selection indexes, the above-mentioned one or more programs include instructions configured to perform actions at the following steps of: monitoring a selection operation on the P stock selection indexes; and in response to a first target stock selection index in the P stock selection indexes being selected, updating a selected stock selection index set and a number of indexes in the selected stock selection index set, and when the selection operation ends, confirming that stock selection indexes in the selected stock selection index set are the Q stock selection indexes. The first target stock selection index is a stock selection index which has not been selected in the P stock selection indexes.

In some embodiments, the P stock selection indexes include at least one stock selection index of a first type and a stock selection index of a second type; in the aspect of the action of obtaining the screening information triggered by the user based on the P stock selection indexes to generate the Q stock selection indexes, or in the aspect of the action of monitoring the selection operation on the P stock selection indexes, the above-mentioned one or more programs include instructions configured to perform actions at the following steps of: selecting a stock selection index of the first type required by the user from the at least one stock selection index of the first type; and/or in response to a screening range triggered by the user based on the stock selection index of the second type, obtaining a stock selection index of the second type required by the user.

In some embodiments, the above-mentioned one or more programs further include instructions configured to perform actions at the following steps of: detecting whether a first target stock selection index has periodicity; and when the first target stock selection index has the periodicity, updating a number of selected periodic indexes corresponding to the first target stock selection index.

In some embodiments, in the aspect of the action of performing the search based on the Q stock selection indexes to obtain the K recommended stocks, the above-mentioned programs include instructions configured to perform actions at the following steps of: sending a stock selection request to a backend, in which the stock selection request carries the Q stock selection indexes; and receiving a stock selection result including the K recommended stocks and being obtained by the backend screening stocks in a stock database based on the Q stock selection indexes.

In some embodiments, the above-mentioned one or more programs further include instructions configured to perform actions at the following steps of: detecting a touch operation on a second target stock selection index in a selected stock selection index set, in which the second target stock selection index is any stock selection index in the selected stock selection index set; when the touch operation is a deletion operation, deleting the second target stock selection index in the selected stock selection index set; and updating the selected stock selection index set and a number of indexes in the selected stock selection index set.

In some embodiments, the above-mentioned one or more programs further include instructions configured to perform actions at the following steps of: detecting a click operation on a third target stock selection index in a selected stock selection index set, the third target stock selection index being any stock selection index in the selected stock selection index set; updating a period corresponding to the third target stock selection index; notifying a corresponding change in a period of an index having a same type as the third target stock selection index; and locating the third target stock selection index.

In some embodiments, the above-mentioned one or more programs further include instructions configured to perform actions at the following steps of, subsequent to the action of obtaining the screening information triggered by the user based on the P stock selection indexes to generate the Q stock selection indexes and prior to the action of performing the search based on the Q stock selection indexes to obtain the K recommended stocks; determining a target input region corresponding to an index screening operation; detecting a touch operation in a region other than the target input region; in response to the touch operation meeting a predetermined requirement, confirming an end of a user input and performing the action of said performing the search based on the Q stock selection indexes to obtain the K recommended stocks.

In some embodiments, the navigation bar includes a condition stock selection menu including a stock menu item, in which the stock menu item includes a screening sub-menu item including the P stock selection indexes; and the above-mentioned one or more programs further include instructions configured to perform an action at the following step of, prior to the action of obtaining the screening information triggered by the user based on the P stock selection indexes to generate the Q stock selection indexes: detecting a touch operation on the screening sub-menu item.

In some embodiments, the stock menu item further includes an advanced stock selection menu item including M stock selection indexes; and the above-mentioned one or more programs further include instructions configured to perform actions at the following steps of: entering the stock selection page; detecting the touch operation on the screening sub-menu item; detecting a touch operation on the advanced stock selection menu item; obtaining screening information triggered by the user based on P stock selection indexes to generate Q stock selection indexes, where P is an integer greater than 1, and Q is a positive integer smaller than or equal to P; obtaining screening information triggered by the user based on M stock selection indexes to generate N stock selection indexes, where M is greater than P, and N is smaller than or equal to M; and performing a search based on the Q stock selection indexes and the N stock selection indexes to obtain K recommended stocks, in which any one of the P stock selection indexes and the M stock selection indexes has a corresponding screening condition including a custom screening condition and a non-custom screening condition.

In some embodiments, the above-mentioned one or more programs further include instructions configured to perform actions at the following steps of: monitoring whether a target stock selection index with a changed screening condition exists in the P stock selection indexes and the M stock selection indexes; and in response to the target stock selection index with the changed screening condition existing in the P stock selection indexes and the M stock selection indexes, updating a screening condition of the target stock selection index, and sending the updated screening condition to an initial stock selection result list corresponding to the K recommended stocks to generate a target stock selection result list.

In some embodiments, the navigation bar further includes a stock selection result list menu; and the above-mentioned one or more programs further include instructions configured to perform actions at the following steps of, subsequent to the action of generating the target stock selection result list: detecting a touch operation on the stock selection result list menu; sending a list update request to a backend based on the touch operation on the stock selection result list menu; and obtaining and displaying the target stock selection result list based on the list update request.

In some embodiments, the above-mentioned one or more programs further include instructions configured to perform actions at the following steps of: obtaining a configuration file; parsing the configuration file to obtain page information corresponding to a component: dynamically creating the component based on the page information, and laying out the created component to generate an advanced stock selection page. The advanced stock selection page is a display page corresponding to the advanced stock selection menu item.

In some embodiments, the advanced stock selection page includes a search bar and a matching result item; and the above-mentioned one or more programs further include instructions configured to perform actions at the following steps of: obtaining a keyword inputted by the user in the search bar; matching the keyword with a field in a database based on a predetermined matching rule to obtain a matching result, in which the matching result is displayed based on a predetermined priority order; detecting a touch operation on the matching result item; and jumping onto a page where a stock selection index corresponding to the matching result is located.

In some embodiments, the stock menu item further includes a my policy sub-menu item; and the above-mentioned one or more programs further include instructions configured to perform actions at the following steps of: generating and saving a target policy based on the Q stock selection indexes and the N stock selection indexes, or the Q stock selection indexes.

In some embodiments, the above-mentioned one or more programs further include instructions configured to perform actions at the following steps of, subsequent to the action of generating and saving the target policy based on the Q stock selection indexes and the N stock selection indexes, or the Q stock selection indexes: detecting a touch operation on the my policy sub-menu item; sending a policy request to a backend based on the touch operation on the my policy sub-menu item; obtaining data corresponding to the target policy based on the policy request; and displaying, on a display page corresponding to the my policy sub-menu item, a name and a date corresponding to the target policy.

In some embodiments, the above-mentioned one or more programs further include instructions configured to perform actions at the following steps of, subsequent to the action of displaying, on the display page corresponding to the my policy sub-menu item, the name and the date corresponding to the target policy: detecting a floating touch operation on the target policy; and displaying, in a display box corresponding to the target policy, an operation identifier for the target policy. The operation identifier at least includes editing, copying, deleting, and more. The more is configured to be unfolded to display all screening conditions in the target policy, and a number of all screening conditions are greater than a predetermined number.

Figure 18:
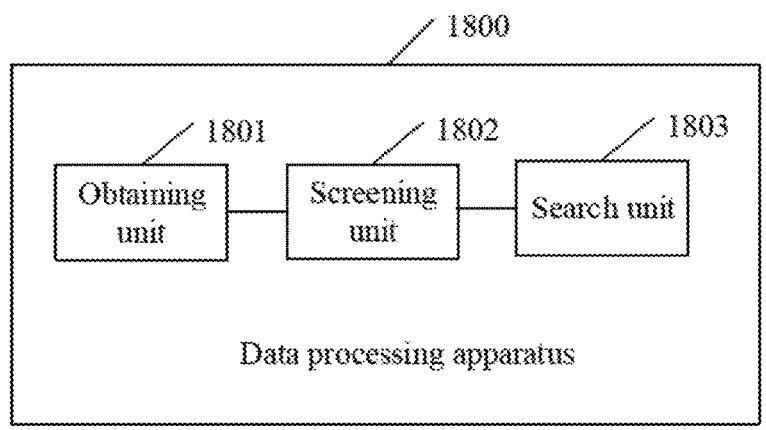
FIG. 18 is a block diagram of functional units of a target recommendation apparatus according to an embodiment of the present disclosure.

It can be seen that the electronic device according to the embodiments of the present disclosure enters the stock selection page including the navigation bar, the navigation bar includes the P stock selection indexes, and P is an integer greater than 1; the electronic device obtains screening information triggered by the user based on the P stock selection indexes to generate the Q stock selection indexes, where Q is the positive integer smaller than or equal to P; and the electronic device performs the search based on the Q stock selection indexes to obtain the K recommended stocks, where K is the positive integer. In this way, the search can be realized based on the stock selection indexes selected by the user to obtain the corresponding recommended stocks. Therefore, the intelligence of the stock selection can be improved. Referring to FIG. 18, FIG. 18 is a target recommendation apparatus according to an embodiment of the present disclosure. The apparatus is applied in an electronic device. An apparatus 1800 includes a display unit 1801, a screening unit 1802, and a search unit 1803.

The display unit 1801 is configured to enter a stock selection page including a navigation bar, the navigation bar including P stock selection indexes, and P being an integer greater than 1. The screening unit 1802 is configured to obtain screening information triggered by a user based on the P stock selection indexes to generate Q stock selection indexes, Q being a positive integer smaller than or equal to P. The search unit 1803 is configured to perform a search based on the Q stock selection indexes to obtain K recommended stocks, K being a positive integer.

In some embodiments, in the aspect of the action of obtaining the screening information triggered by the user based on the P stock selection indexes to generate the Q stock selection indexes, the screening unit 1802 is specifically configured to: monitor a selection operation on the P stock selection indexes: and in response to a first target stock selection index in the P stock selection indexes being selected, update a selected stock selection index set and a number of indexes in the selected stock selection index set, and when the selection operation ends, confirm that stock selection indexes in the selected stock selection index set are the Q stock selection indexes. The first target stock selection index is a stock selection index which has not been selected in the P stock selection indexes.

In some embodiments, the P stock selection indexes include at least one stock selection index of a first type and a stock selection index of a second type; and in the aspect of the action of obtaining the screening information triggered by the user based on the P stock selection indexes to generate the Q stock selection indexes or in the aspect of the action of monitoring the selection operation on the P stock selection indexes, the screening unit 1802 is specifically configured to: select a stock selection index of the first type required by the user from the at least one stock selection index of the first type; and/or in response to a screening range triggered by the user based on the stock selection index of the second type, obtain a stock selection index of the second type required by the user.

In some embodiments, the screening unit 1802 is further specifically configured to: detect whether a first target stock selection index has periodicity; and when the first target stock selection index has the periodicity, update a number of selected periodic indexes corresponding to the first target stock selection index.

In some embodiments, in the aspect of the action of performing the search based on the Q stock selection indexes to obtain the K recommended stocks, the above-mentioned programs include instructions configured to perform actions at the following steps of: sending a stock selection request to a backend, in which the stock selection request carries the Q stock selection indexes; and receiving a stock selection result including the K recommended stocks and being obtained by the backend screening stocks in a stock database based on the Q stock selection indexes.

In some embodiments, the apparatus 1800 is further specifically configured to: detect a touch operation on a second target stock selection index in a selected stock selection index set, in which the second target stock selection index is any stock selection index in the selected stock selection index set; when the touch operation is a deletion operation, delete the second target stock selection index in the selected stock selection index set; and update the selected stock selection index set and a number of indexes in the selected stock selection index set.

In some embodiments, the apparatus 1800 is further specifically configured to: detect a click operation on a third target stock selection index in a selected stock selection index set, in which the third target stock selection index is any stock selection index in the selected stock selection index set; update a period corresponding to the third target stock selection index; notify a corresponding change in a period of an index having a same type as the third target stock selection index; and locate the third target stock selection index.

In some embodiments, the device 1800 is further specifically configured to, subsequent to the action of obtaining the screening information triggered by the user based on the P stock selection indexes to generate the Q stock selection indexes and prior to the action of performing the search based on the Q stock selection indexes to obtain the K recommended stocks: determine a target input region corresponding to an index screening operation; detect a touch operation in a region other than the target input region; in response to the touch operation meeting a predetermined requirement, confirm an end of a user input and perform the action of said performing the search based on the Q stock selection indexes to obtain the K recommended stocks.

In some embodiments, the navigation bar includes a condition stock selection menu including a stock menu item, in which the stock menu item includes a screening sub-menu item including the P stock selection indexes; and the apparatus 1800 is further specifically configured to, prior to the action of obtaining the screening information triggered by the user based on the P stock selection indexes to generate the Q stock selection indexes; detect a touch operation on the screening sub-menu item.

In some embodiments, the stock menu item further includes an advanced stock selection menu item including M stock selection indexes; and the apparatus 1800 is further specifically configured to: enter the stock selection page; detect the touch operation on the screening sub-menu item; detect a touch operation on the advanced stock selection menu item; obtain screening information triggered by the user based on P stock selection indexes to generate Q stock selection indexes, where P is an integer greater than 1, and Q is a positive integer smaller than or equal to P; obtain screening information triggered by the user based on M stock selection indexes to generate N stock selection indexes, where M is greater than P, and N is smaller than or equal to M; and perform a search based on the Q stock selection indexes and the N stock selection indexes to obtain K recommended stocks. Any one of the P stock selection indexes and the M stock selection indexes has a corresponding screening condition including a custom screening condition and a non-custom screening condition.

In some embodiments, the apparatus 1800 is further specifically configured to: monitor whether a target stock selection index with a changed screening condition exists in the P stock selection indexes and the M stock selection indexes; and in response to the target stock selection index with the changed screening condition existing in the P stock selection indexes and the M stock selection indexes, update a screening condition of the target stock selection index, and send the updated screening condition to an initial stock selection result list corresponding to the K recommended stocks to generate a target stock selection result list.

In some embodiments, the navigation bar further includes a stock selection result list menu; and the apparatus 1800 is further specifically configured to, subsequent to the action of generating the target stock selection result list: detect a touch operation on the stock selection result list menu; send a list update request to a backend based on the touch operation on the stock selection result list menu; and obtain and display the target stock selection result list based on the list update request.

In some embodiments, the apparatus 1800 is further specifically configured to: obtain a configuration file; parse the configuration file to obtain page information corresponding to a component; and dynamically create the component based on the page information, and lay out the created component to generate an advanced stock selection page. The advanced stock selection page is a display page corresponding to the advanced stock selection menu item.

In some embodiments, the advanced stock selection page includes a search bar and a matching result item; and the apparatus 1800 is further specifically configured to: obtain a keyword inputted by the user in the search bar; match the keyword with a field in a database based on a predetermined matching rule to obtain a matching result, the matching result being displayed based on a predetermined priority order; detect a touch operation on the matching result item; and jump onto a page where a stock selection index corresponding to the matching result is located.

In some embodiments, the stock menu item further includes a my policy sub-menu item; and the apparatus 1800 is further specifically configured to: generate and save a target policy based on the Q stock selection indexes and the N stock selection indexes, or the Q stock selection indexes.

In some embodiments, the apparatus 1800 is further specifically configured to, subsequent to the action of generating and saving the target policy based on the Q stock selection indexes and the N stock selection indexes, or the Q stock selection indexes: detect a touch operation on the my policy sub-menu item; send a policy request to a backend based on the touch operation on the my policy sub-menu item; obtain data corresponding to the target policy based on the policy request; and display, on a display page corresponding to the my policy sub-menu item, a name and a date corresponding to the target policy.

In some embodiments, the apparatus 1800 is further specifically configured to, subsequent to the action of displaying, on the display page corresponding to the my policy sub-menu item, the name and the date corresponding to the target policy: detect a floating touch operation on the target policy; and display, in a display box corresponding to the target policy, an operation identifier for the target policy. The operation identifier at least includes editing, copying, deleting, and more. The more is configured to be unfolded to display all screening conditions in the target policy, and a number of all screening conditions are greater than a predetermined number.

It can be seen that the target recommendation apparatus described in the embodiments of the present disclosure is applied in the electronic device. The stock selection page including the navigation bar is entered, the navigation bar includes the P stock selection indexes, and P is an integer greater than 1; screening information triggered by the user based on the P stock selection indexes is obtained to generate the Q stock selection indexes, where Q is the positive integer smaller than or equal to P; and the search is performed based on the Q stock selection indexes to obtain the K recommended stocks, where K is the positive integer. In this way, the search can be realized based on the stock selection indexes selected by the user to obtain the corresponding recommended stocks. Therefore, the intelligence of the stock selection can be improved.

It can be understood that functions of each program module of the target recommendation apparatus of this embodiment can be specifically implemented based on the method in the above-mentioned method embodiments, and a specific implementation process can refer to the relevant description of the above-mentioned method embodiments, which is not repeated herein.

Embodiments of the present disclosure further provide a computer-readable storage medium. The computer-readable storage medium has stored thereon a computer program configured to exchange electronic data. The computer program causes a computer to perform some or all of the steps described in the above-mentioned method embodiments.

Embodiments of the present disclosure further provide a computer program product. The computer program product includes a non-transitory computer-readable storage medium storing a computer program. The computer program is operable to cause a computer to perform some or all of the steps described for the electronic device in the above-mentioned method. The computer program product may be a software installation package.

The steps of the methods or the algorithms described in embodiments of the present disclosure may be implemented in hardware or by a processor executing software instructions. The software instruction may be composed of a corresponding software module. The software module may be stored in a Random Access Memory (RAM), a flash memory, a Read-only Memory (ROM), an Erasable Programmable Read-only Memory (EPROM), an Electrically EPROM (EEPROM), a register, a hard disk, a mobile hard disk, a Read-only Optical Disk (CD-ROM), or any other form of storage medium well known in the art. An exemplary storage medium is coupled to the processor to enable the processor to read information from the storage medium and write information to the storage medium. The storage medium may also be a component of the processor. The processor and the storage medium may be located in an ASIC. In addition, the ASIC may be located in an access network device, a target network device, or a core network device. The processor and the storage medium may also exist as discrete components in the access network device, the target network device, or the core network device.

Those skilled in the art should be aware that, in the above-mentioned one or more examples, the functions described in the embodiments of the present disclosure may be implemented fully or partially by software, hardware, firmware or any other combination. When implemented by software, it is possible to implement the functions fully or partially in a form of computer program products. The computer program product includes one or more computer instructions. When the computer program instructions are loaded and executed by the computer, procedures or functions according to embodiments of the present disclosure are fully or partially generated. The computer may be a general-purpose computer, a special-purpose computer, a computer network, or any other programmable device. The computer instructions may be stored in a computer readable storage medium, or may be transmitted from one computer readable storage medium to another computer readable storage medium. For example, the computer instructions may be transmitted from one website, computer, server or data center to another website, computer, server or data center in a wired manner (for example, via coaxial cables, fiber optics, or DSL (digital subscriber line)) or in a wireless manner (for example, via infrared, wireless or microwave). The computer readable storage medium may be any available medium that are accessible by the computer, or a data storage device such as a server or a data center integrated with one or more available medium. The available medium may be magnetic medium (for example, floppy disk, hard disk and tape), optical medium (for example, DVD (digital video disc)), or semiconductor medium (for example, SSD (solid state disk)).

The above-mentioned specific embodiments provide a further detailed description of the purposes, technical solutions and beneficial effects of the embodiments of the present disclosure. It should be understood that the above-mentioned specific embodiments are only specific implementations of the embodiments of the present disclosure and are not intended to limit the protection scope of the embodiments of the present disclosure, and any modifications, equivalent substitutions, improvements, etc., made based on the technical solutions of the embodiments of the present disclosure shall fall within the protection scope of the embodiments of the present disclosure.

What is claimed is:

1. A target recommendation method, comprising:
    entering a stock selection page comprising a navigation bar, the navigation bar comprising P stock selection indexes, P being an integer greater than 1, each stock selection index in the P stock selection indexes having a different type, each stock selection index corresponding to an editable index list, and an index in the index list being unfoldable or foldable, wherein for indexes of a same type, an index with a period is placed below an index without a period, when sliding to the index with the period, a corresponding period screening item is suspended at a top to facilitate a user to quickly switch the period;
    obtaining screening information triggered by a user based on the P stock selection indexes to generate Q stock selection indexes, Q being a positive integer smaller than or equal to P;
    performing a search based on the Q stock selection indexes to obtain K recommended stocks, K being a positive integer;
    detecting a click operation on a third target stock selection index in a selected stock selection index set, the third target stock selection index being any stock selection index in the selected stock selection index set;
    updating a period corresponding to the third target stock selection index;
    notifying a corresponding change in a period of an index having a same type as the third target stock selection index;
    locating the third target stock selection index;
    obtaining a target face image of the user;
    matching the target face image with a predetermined face template;
    in response to the target face image successfully matching the predetermined face template, obtaining target user level information corresponding to the predetermined face template; and
    screening the K recommended stocks based on the user level information to obtain M recommended stocks, M being a positive integer smaller than or equal to K;
    wherein said matching the target face image with the predetermined face template comprises:
    determining a target shooting parameter corresponding to the target face image;
    obtaining a target time difference between current face recognition and previous face recognition;
    determining a first target adjustment parameter corresponding to the target shooting parameter based on a predetermined mapping relationship between a shooting parameter and a first adjustment parameter, the first adjustment parameter ranging from −0.1 to 0.1;
    determining a second target adjustment parameter corresponding to the target time difference based on a predetermined mapping relationship between a time difference and a second adjustment parameter, the second adjustment parameter ranging from 0 to 0.2;
    obtaining a predetermined face recognition threshold;
    adjusting the predetermined face recognition threshold based on the first target adjustment parameter and the second target adjustment parameter to obtain a target face recognition threshold, wherein the target face recognition threshold=(1+first target adjustment coefficient)*(1−second target adjustment coefficient); and matching the target face image with the predetermined face template based on the target face recognition threshold.

2. The method according to claim 1, wherein said obtaining the screening information triggered by the user based on the P stock selection indexes to generate the Q stock selection indexes comprises:

monitoring a selection operation on the P stock selection indexes; and in response to a first target stock selection index in the P stock selection indexes being selected, updating a selected stock selection index set and a number of indexes in the selected stock selection index set, and when the selection operation ends, confirming that stock selection indexes in the selected stock selection index set are the Q stock selection indexes, the first target stock selection index being a stock selection index which has not been selected in the P stock selection indexes.

3. The method according to claim 1, wherein:

the P stock selection indexes comprise at least one stock selection index of a first type and a stock selection index of a second type; and said obtaining the screening information triggered by the user based on the P stock selection indexes to generate the Q stock selection indexes comprises:

selecting a stock selection index of the first type required by the user from the at least one stock selection index of the first type; and/or in response to a screening range triggered by the user based on the stock selection index of the second type, obtaining a stock selection index of the second type required by the user.

4. The method according to claim 3, further comprising:

detecting whether a first target stock selection index has periodicity; and when the first target stock selection index has the periodicity, updating a number of selected periodic indexes corresponding to the first target stock selection index.

5. The method according to claim 1, wherein said performing the search based on the Q stock selection indexes to obtain the K recommended stocks comprises:

sending a stock selection request to a backend, the stock selection request carrying the Q stock selection indexes; and receiving a stock selection result comprising the K recommended stocks and being obtained by the backend screening stocks in a stock database based on the Q stock selection indexes.

6. The method according to claim 1, further comprising:

detecting a touch operation on a second target stock selection index in a selected stock selection index set, the second target stock selection index being any stock selection index in the selected stock selection index set;

when the touch operation is a deletion operation, deleting the second target stock selection index in the selected stock selection index set; and updating the selected stock selection index set and a number of indexes in the selected stock selection index set.

7. The method according to claim 1, further comprising, subsequent to said obtaining the screening information triggered by the user based on the P stock selection indexes to generate the Q stock selection indexes and prior to said performing the search based on the Q stock selection indexes to obtain the K recommended stocks:

determining a target input region corresponding to an index screening operation;

detecting a touch operation in a region other than the target input region;

in response to the touch operation meeting a predetermined requirement, confirming an end of a user input and performing the action of said performing the search based on the Q stock selection indexes to obtain the K recommended stocks.

8. The method according to claim 1, wherein:

the navigation bar comprises a condition stock selection menu comprising a stock menu item, the stock menu item comprising a screening sub-menu item comprising the P stock selection indexes; and the method further comprises, prior to said obtaining the screening information triggered by the user based on the P stock selection indexes to generate the Q stock selection indexes:

detecting a touch operation on the screening sub-menu item.

9. The method according to claim 8, wherein:

the stock menu item further comprises an advanced stock selection menu item comprising M stock selection indexes; and the method further comprises:

entering the stock selection page;

detecting the touch operation on the screening sub-menu item;

detecting a touch operation on the advanced stock selection menu item;

obtaining screening information triggered by the user based on P stock selection indexes to generate Q stock selection indexes, P being an integer greater than 1, and Q being a positive integer smaller than or equal to P;

obtaining screening information triggered by the user based on M stock selection indexes to generate N stock selection indexes, M being greater than P, and N being smaller than or equal to M; and performing a search based on the Q stock selection indexes and the N stock selection indexes to obtain K recommended stocks, any one of the P stock selection indexes and the M stock selection indexes having a corresponding screening condition comprising a custom screening condition and a non-custom screening condition.

10. The method according to claim 9, further comprising:

monitoring whether a target stock selection index with a changed screening condition exists in the P stock selection indexes and the M stock selection indexes;

in response to the target stock selection index with the changed screening condition existing in the P stock selection indexes and the M stock selection indexes, updating a screening condition of the target stock selection index, and sending the updated screening condition to an initial stock selection result list corresponding to the K recommended stocks to generate a target stock selection result list.

11. The method according to claim 10, wherein:

the navigation bar further comprises a stock selection result list menu; and the method further comprises, subsequent to said generating the target stock selection result list:

detecting a touch operation on the stock selection result list menu;

sending a list update request to a backend based on the touch operation on the stock selection result list menu; and obtaining and displaying the target stock selection result list based on the list update request.

12. The method according to claim 9, further comprising:
obtaining a configuration file;
parsing the configuration file to obtain page information corresponding to a component;
dynamically creating the component based on the page information, and laying out the created component to generate an advanced stock selection page, the advanced stock selection page being a display page corresponding to the advanced stock selection menu item.

13. The method according to claim 12, wherein:
the advanced stock selection page comprises a search bar and a matching result item; and
the method further comprises:
  obtaining a keyword inputted by the user in the search bar;
  matching the keyword with a field in a database based on a predetermined matching rule to obtain a matching result, the matching result being displayed based on a predetermined priority order;
  detecting a touch operation on the matching result item; and
  jumping onto a page where a stock selection index corresponding to the matching result is located.

14. The method according to claim 9, wherein:
the stock menu item further comprises a my policy sub-menu item; and
the method further comprises:
  generating and saving a target policy based on the Q stock selection indexes and the N stock selection indexes, or the Q stock selection indexes.

15. The method according to claim 14, further comprising, subsequent to said generating and saving the target policy based on the Q stock selection indexes and the N stock selection indexes, or the Q stock selection indexes:
  detecting a touch operation on the my policy sub-menu item;
  sending a policy request to a backend based on the touch operation on the my policy sub-menu item;
  obtaining data corresponding to the target policy based on the policy request; and
  displaying, on a display page corresponding to the my policy sub-menu item, a name and a date corresponding to the target policy.

16. The method according to claim 15, further comprising, subsequent to said displaying, on the display page corresponding to the my policy sub-menu item, the name and the date corresponding to the target policy:
  detecting a floating touch operation on the target policy; and
  displaying, in a display box corresponding to the target policy, an operation identifier for the target policy, the operation identifier at least comprising editing, copying, deleting, and more, the more being configured to be unfolded to display all screening conditions in the target policy, and a number of all screening conditions being greater than a predetermined number.

17. A target recommendation apparatus, applied in an electronic device, the apparatus comprising:
a display unit configured to enter a stock selection page comprising a navigation bar, the navigation bar comprising P stock selection indexes, P being an integer greater than 1, each stock selection index in the P stock selection indexes having a different type, each stock selection index corresponding to an editable index list, and an index in the index list being unfoldable or foldable, wherein for indexes of a same type, an index with a period is placed below an index without a period, when sliding to the index with the period, a corresponding period screening item is suspended at a top to facilitate a user to quickly switch the period;
a screening unit configured to obtain screening information triggered by a user based on the P stock selection indexes to generate Q stock selection indexes, Q being a positive integer smaller than or equal to P;
a search unit configured to perform a search based on the Q stock selection indexes to obtain K recommended stocks, K being a positive integer,
wherein the apparatus is further configured to: detect a click operation on a third target stock selection index in a selected stock selection index set, the third target stock selection index being any stock selection index in the selected stock selection index set; update a period corresponding to the third target stock selection index; notify a corresponding change in a period of an index having a same type as the third target stock selection index; and locate the third target stock selection index,
wherein the apparatus is further configured to: obtain a target face image of the user; match the target face image with a predetermined face template; in response to the target face image successfully matching the predetermined face template, obtain target user level information corresponding to the predetermined face template; and screen the K recommended stocks based on the user level information to obtain M recommended stocks, M being a positive integer smaller than or equal to K;
wherein said matching the target face image with the predetermined face template comprises: determining a target shooting parameter corresponding to the target face image; obtaining a target time difference between current face recognition and previous face recognition; determining a first target adjustment parameter corresponding to the target shooting parameter based on a predetermined mapping relationship between a shooting parameter and a first adjustment parameter, the first adjustment parameter ranging from −0.1 to 0.1; determining a second target adjustment parameter corresponding to the target time difference based on a predetermined mapping relationship between a time difference and a second adjustment parameter, the second adjustment parameter ranging from 0 to 0.2; obtaining a predetermined face recognition threshold; adjusting the predetermined face recognition threshold based on the first target adjustment parameter and the second target adjustment parameter to obtain a target face recognition threshold, wherein the target face recognition threshold=(1+first target adjustment coefficient)*(1−second target adjustment coefficient); and matching the target face image with the predetermined face template based on the target face recognition threshold.

18. An electronic device, comprising:
a processor;
a memory;
a communication interface; and
one or more programs,
wherein the one or more programs are stored in the memory and configured to be executed by the processor, and the one or more programs comprise instructions configured to perform the steps in the method according to claim 1.

19. A computer-readable storage medium having a computer program stored thereon, wherein the computer program, when executed by a processor, implements the method according to claim 1.

* * * * *